(12) United States Patent
Johnson, II et al.

(10) Patent No.: US 10,742,750 B2
(45) Date of Patent: Aug. 11, 2020

(54) MANAGING A DISTRIBUTED NETWORK OF FUNCTION EXECUTION ENVIRONMENTS

(71) Applicant: Cisco Technology, Inc., San Jose, CA (US)

(72) Inventors: Pete Johnson, II, Fullerton, CA (US); Scott Sanchez, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 15/806,702

(22) Filed: Nov. 8, 2017

(65) Prior Publication Data

US 2019/0028552 A1 Jan. 24, 2019

Related U.S. Application Data

(60) Provisional application No. 62/534,996, filed on Jul. 20, 2017.

(51) Int. Cl.
  *G06F 15/16* (2006.01)
  *H04L 29/08* (2006.01)
  *H04L 12/725* (2013.01)

(52) U.S. Cl.
  CPC ............ *H04L 67/16* (2013.01); *H04L 45/306* (2013.01); *H04L 67/02* (2013.01); *H04L 67/10* (2013.01);
  (Continued)

(58) Field of Classification Search
  CPC ....... H04L 45/306; H04L 67/02; H04L 67/10; H04L 67/146; H04L 67/16; H04L 67/327
  See application file for complete search history.

(56) References Cited

U.S. PATENT DOCUMENTS 7,114,171 B2 * 9/2006 Brady, Jr. ............... H04L 29/06
  348/E7.086
9,209,995 B2 12/2015 Ansari et al.
  (Continued)

FOREIGN PATENT DOCUMENTS

EP 1276047 1/2003

OTHER PUBLICATIONS

International Search Report and Written Opinion from the International Searching Authority, dated Oct. 23, 2018, 11 pages, for corresponding International Patent Application No. PCT/US2018/042617.

(Continued)

*Primary Examiner* — Moustafa M Meky
*Assistant Examiner* — Thorne E Waugh
(74) *Attorney, Agent, or Firm* — Polsinelli PC

(57) ABSTRACT

Systems, methods, and computer-readable media for managing a distributed network of function execution environments. In some examples, a function router registers a plurality of execution endpoints on a catalog of execution endpoints and functions, each of the plurality of execution endpoints including a respective runtime environment capable of executing one or more functions. The function router receives, from a client, a request to execute a particular function and, based on the request, queries the catalog for the particular function and execution endpoints associated with the particular function. The function router receives a query response identifying one or more execution endpoints associated with the particular function, and selects an execution endpoint for executing the particular function based on one or more criteria associated with the request. The function router then sends to the client a response identifying the execution endpoint selected for executing the particular function.

20 Claims, 16 Drawing Sheets

(52) U.S. Cl.
CPC .......... *H04L 67/146* (2013.01); *H04L 67/327* (2013.01)

(56) References Cited

U.S. PATENT DOCUMENTS

| | | | |
|---|---|---|---|
| 9,407,693 | B2 | 8/2016 | Singhal et al. |
| 9,553,799 | B2 | 1/2017 | Tarricone et al. |
| 9,554,275 | B1* | 1/2017 | Bantoft .................... H04L 51/38 |
| 2009/0092124 | A1* | 4/2009 | Singhal ................ H04L 67/104 370/351 |
| 2010/0017368 | A1* | 1/2010 | Mao ....................... G06F 9/5055 707/E17.014 |
| 2012/0042040 | A1* | 2/2012 | Bailey .................... G06F 9/5055 709/217 |
| 2016/0057211 | A1* | 2/2016 | Thapliyal ................ H04L 67/02 709/203 |
| 2016/0301762 | A1 | 10/2016 | Strijkers et al. |
| 2017/0026464 | A1 | 1/2017 | Veeravarapu et al. |
| 2018/0034924 | A1* | 2/2018 | Horwood ................ H04L 67/40 |
| 2018/0254998 | A1* | 9/2018 | Cello ..................... H04L 67/10 |
| 2018/0270301 | A1* | 9/2018 | Zhang ....................... G06F 9/44 |
| 2019/0014171 | A1* | 1/2019 | Stein ....................... G06F 9/542 |
| 2019/0045207 | A1* | 2/2019 | Chen ....................... G06F 21/45 |

OTHER PUBLICATIONS

Szyperski, Clemens, "Chapter Fourteen, The Microsoft way: DCOM, OLE, and ActiveX, Component Software, Beyond Object-Oriented Programming," published 1997, reprinted 1998 and 1999, ACM Press, New York, USA, pp. 194-217.

\* cited by examiner

US 10,742,750 B2

MANAGING A DISTRIBUTED NETWORK OF FUNCTION EXECUTION ENVIRONMENTS

CROSS-REFERENCE TO RELATED APPLICATIONS

This application claims the benefit of, and priority to, U.S. Provisional Patent Application No. 62/534,996, filed on Jul. 20, 2017, entitled "MANAGING A DISTRIBUTED NETWORK OF FUNCTION EXECUTION ENVIRONMENTS", the contents of which are hereby expressly incorporated by reference in its entirety.

TECHNICAL FIELD

The present technology pertains in general to serverless computing.

BACKGROUND

Cloud computing aggregates physical and virtual compute, storage, and network resources in the "cloud", and offers customers ways to utilize the aggregated resources. Typically, cloud providers manage the infrastructure and resources, thus relieving this burden from customers. Cloud computing models allow developers to deploy applications and increasingly shift to the cloud provider the burden of managing the infrastructure and resources for the applications. For example, serverless computing provides a cloud computing execution model which allows developers to build applications and outsource infrastructure and resource allocation responsibilities to the cloud provider. The underlying infrastructure used to run the developer's applications is hosted and managed by the cloud provider.

Serverless computing is often provided as a service for running code for a client. The client uploads the code to the cloud, and the cloud manages the resources for running the code. The cloud executes the code in response to an event configured to trigger the code. The client pays the cloud provider based on the compute time consumed by execution of the code. Serverless computing can thus simplify application deployment for developers. Unfortunately, however, serverless computing frameworks reduce control and visibility. For example, clients have little control over the execution environment, and limited ability to enforce policies. Moreover, serverless computing frameworks can be prone to latency issues, which often depend on the location of the execution environment and the underlying network(s) traversed by the traffic.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
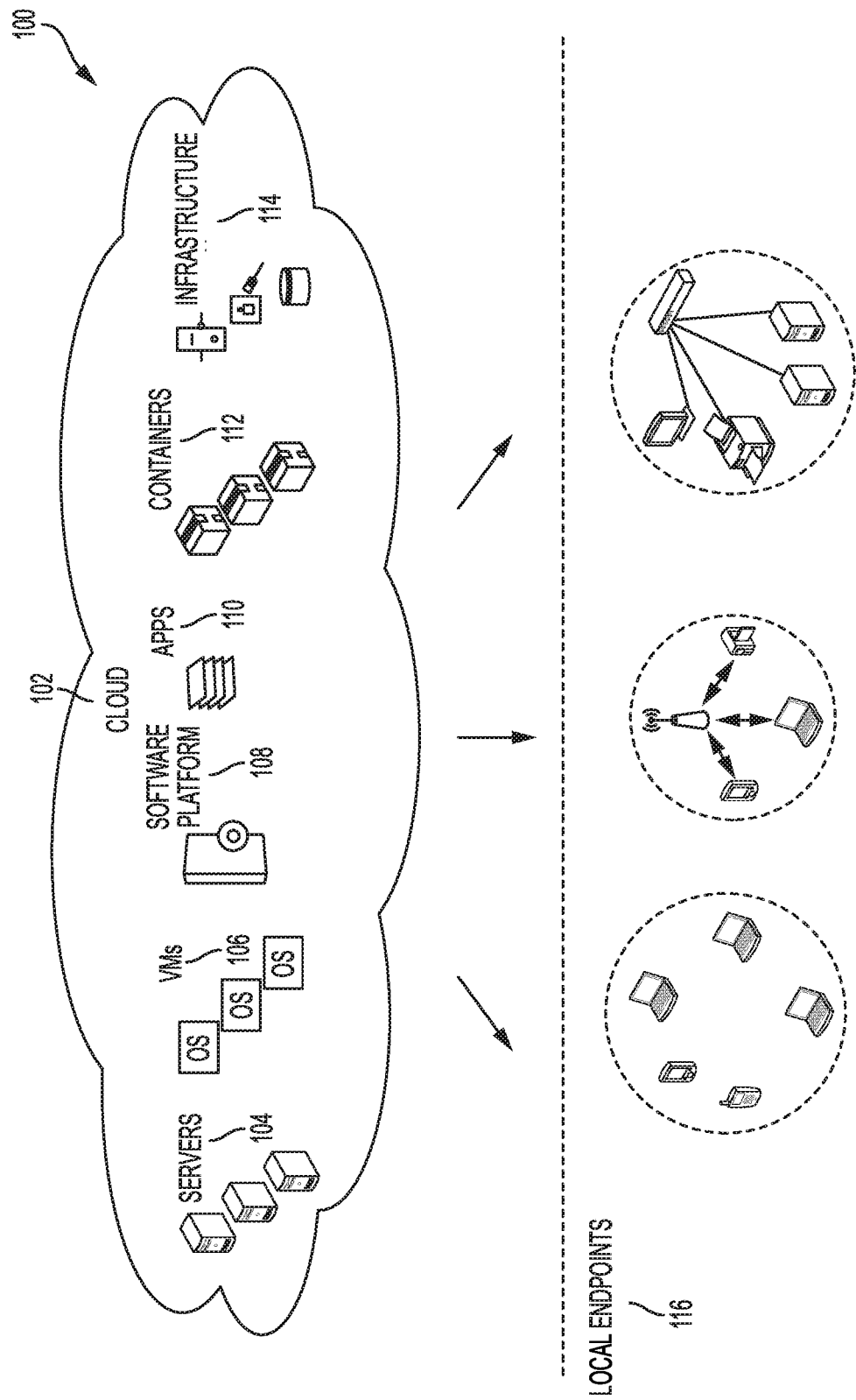
FIG. 1A illustrates an example cloud computing environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

As used herein, "one embodiment" or "an embodiment" can refer to the same embodiment or any embodiment(s). Moreover, reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Features described herein with reference to one embodiment can be combined with features described with reference to any embodiment.

The terms used in this specification generally have their ordinary meanings in the art, within the context of the disclosure and the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification, including examples of any terms discussed herein, is illustrative and not intended to limit the scope and meaning of the disclosure or any example term. Likewise, the disclosure is not limited to the specific embodiments or examples described in this disclosure.

Without an intent to limit the scope of the disclosure, examples of instruments, apparatus, methods and their related functionalities are provided below. Titles or subtitles may be used in the examples for convenience of a reader, and in no way should limit the scope of the disclosure. Unless otherwise defined, technical and scientific terms used herein have the meaning as commonly understood by one of ordinary skill in the art to which this disclosure pertains. In the case of a conflict, the present document and included definitions will control.

Additional features and advantages of the disclosure will be set forth in the description which follows, and in part will be recognized from the description, or can be learned by practice of the herein disclosed principles. The features and advantages of the disclosure can be realized and obtained by means of the instruments and combinations particularly pointed out herein. These and other features of the disclosure will become more fully apparent from the following description and appended claims, or can be learned by the practice of the principles set forth herein.

Overview

Disclosed are systems, methods, and computer-readable media for managing a distributed network of function execution environments. In some examples, a function router can be deployed to manage a distributed network of function execution environments. The function router can include a device and/or service that provides for registration and management of execution endpoints, FaaS (function-as-a-service) services, functions, clients, locations, routing rules, etc. The function router can receive requests for function execution from clients and dynamically route them to the 'best' endpoint to execute that function based on one or more rules.

For example, a function router can register a plurality of execution endpoints on a catalog of execution endpoints and functions. An execution endpoint can include any computer system capable of running functions. Each execution endpoint can include a respective runtime environment for executing one or more functions. The execution endpoints can reside on different networks, such as one or more local networks, cloud networks, regional networks, etc.

The function router can also maintain a catalog of functions available for execution in the distributed network. The catalog of functions can be part of the catalog of execution endpoints or a separate catalog which can be related or mapped to the catalog of execution endpoints. Thus, the catalog can identify the functions available in the distributed network for execution and the execution endpoints available for executing functions. A function can include a portion of code. The code can represent, for example, an ephemeral, self-contained set of logic or operations. The functions can perform one or more specific tasks when called and executed, and subsequently become dormant (but ready) when execution completes.

The function router can receive, from a client, a request to execute a particular function and, based on the request, query the catalog for execution endpoints associated with the particular function. The function router can query the catalog to identify the particular function, one or more execution endpoints for execution of the particular function, and information about the execution endpoints. The client can include a device and/or application seeking to execute a function on an execution endpoint.

The function router can receive a query response from the catalog, identifying one or more execution endpoints associated with the particular function, and select, from the one or more execution endpoints associated with the particular function, an execution endpoint for executing the particular function. After selecting the execution endpoint for executing the particular function, the function router can send a response to the client identifying the execution endpoint selected for executing the particular function.

The function router can select the execution endpoint based on one or more criteria associated with the request from the client. The one or more criteria can include, for example, a respective availability, a respective cost, a respective security level, a respective performance level, a respective location, etc. The one or more criteria can also include one or more function routing rules.

Function routing rules can include policies and controls defining the various aspects of function execution (e.g., the who, what, when, where, why, and/or how). The rules can include guardrails that affect the entire system, and any rules specified for the particular function. Example function routing rules can include: Function A can run on any endpoint but Function B must only run on a private endpoint, or Function A can be called by any client in a specific location but function B can only be called by specific clients in any location.

In some examples, the function router can select the execution endpoint based on a location of the execution endpoint and/or the client. For example, the function router can select the execution endpoint based on the respective proximity of the client and each of the one or more execution endpoints associated with the particular function. A location can include a physical, geographic, and/or logical location (e.g., a building, a floor, a region, a network, etc.). In some cases, a location can be associated with specific latitude and longitude coordinates. For example, a location can refer to specific latitude and longitude coordinates corresponding to a manufacturing floor where a client application resides, a conference room where an FaaS device is located, or a region associated with an execution environment.

Description of Example Embodiments

The disclosed technology addresses the need in the art for serverless applications and FaaS (function-as-a-service) services. The present technology involves systems, methods, and computer-readable media for efficiently and effectively creating a distributed network of function execution environments for FaaS and serverless applications. For example, the approaches herein can leverage available hardware devices in the cloud and outside of the cloud to create a distributed network of function execution environments which can be used to intelligently route job requests for serverless applications to optimal execution environments in or out of the cloud, in order to increase performance and decrease latency when executing FaaS services.

Figure 1B:
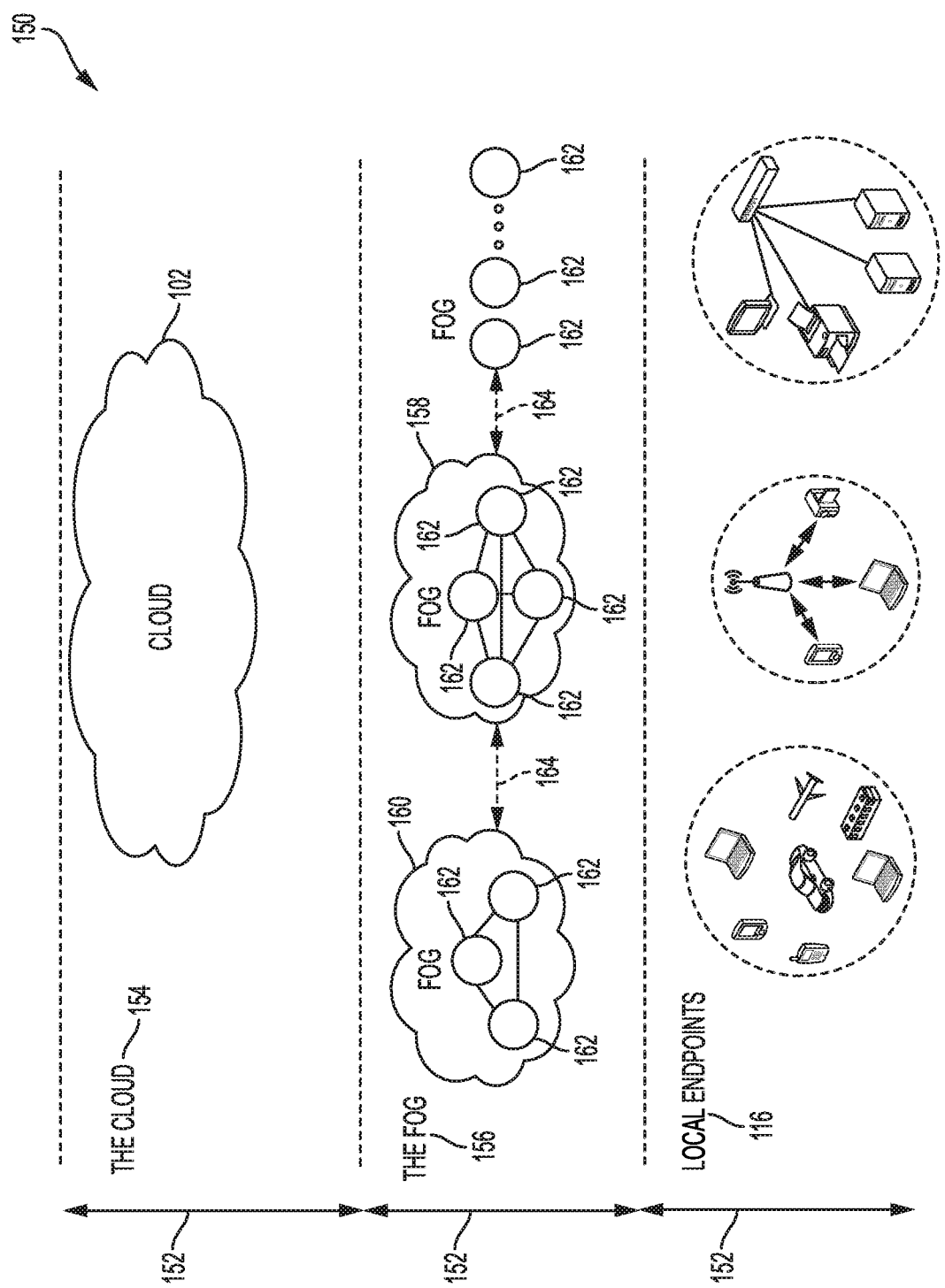
FIG. 1B illustrates an example fog computing environment.
Figure 2:
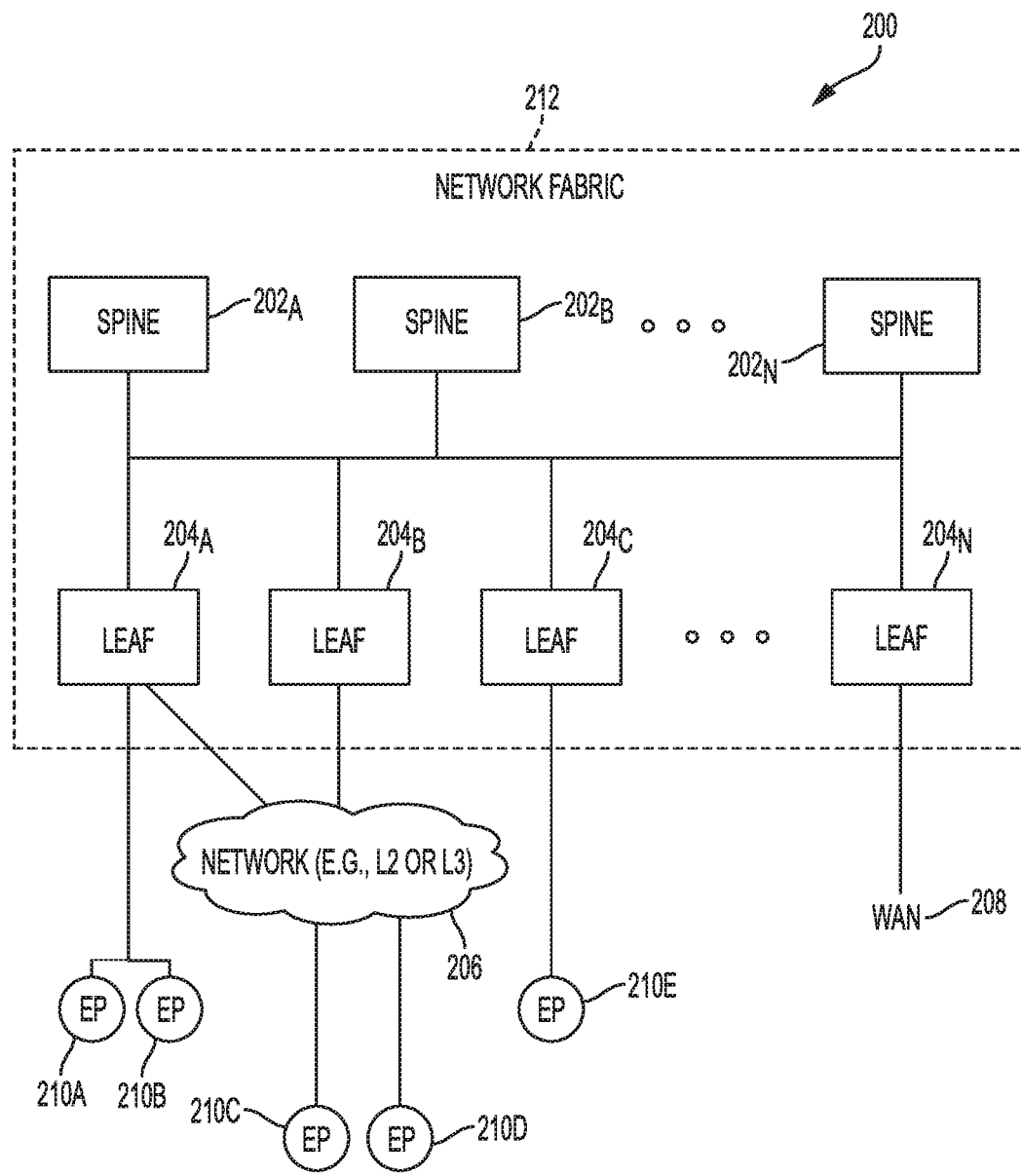
FIG. 2 illustrates a schematic diagram of an example network architecture.
Figure 11:
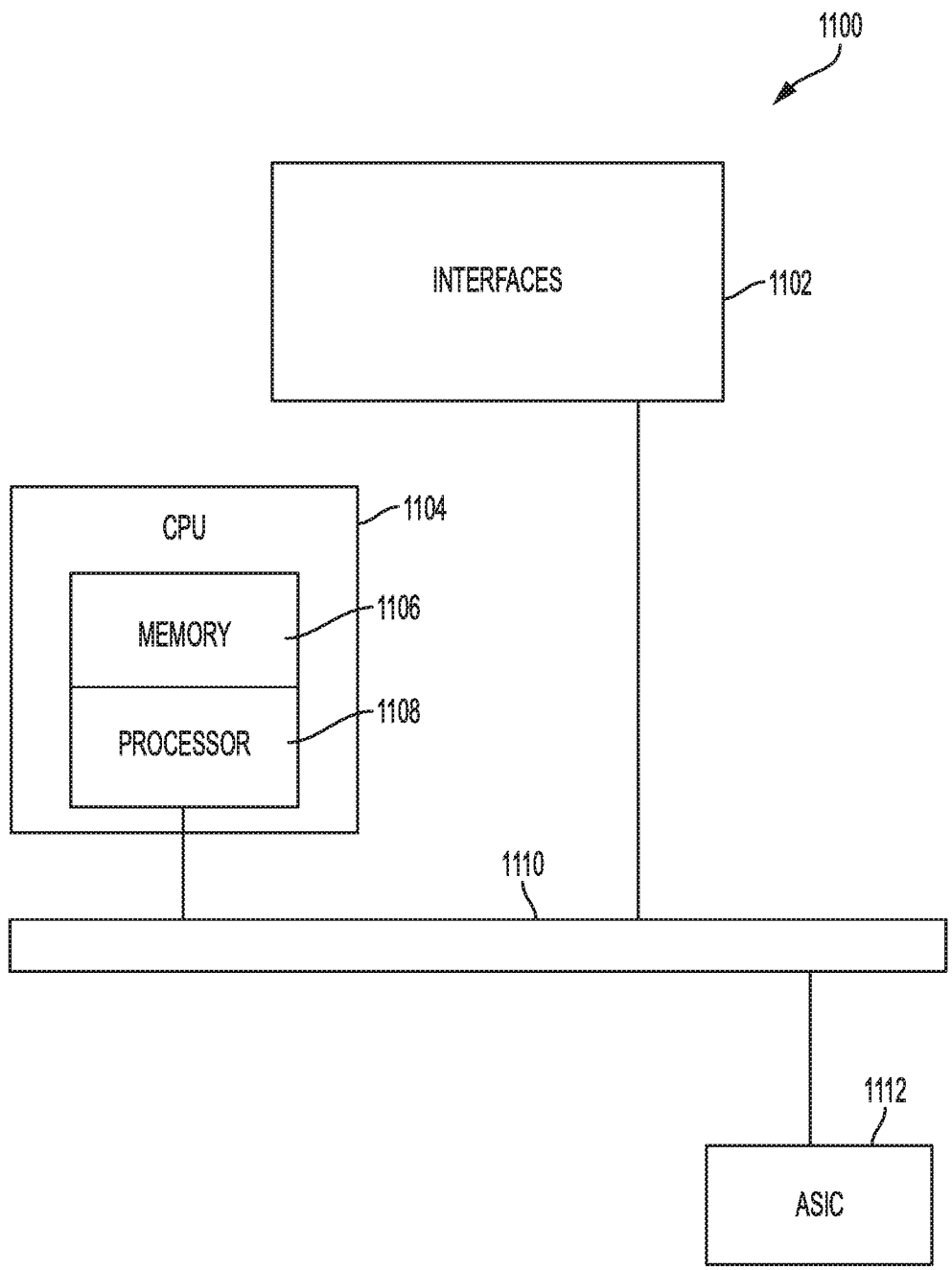
FIG. 11 illustrates an example network device in accordance with various embodiments.
Figure 12:
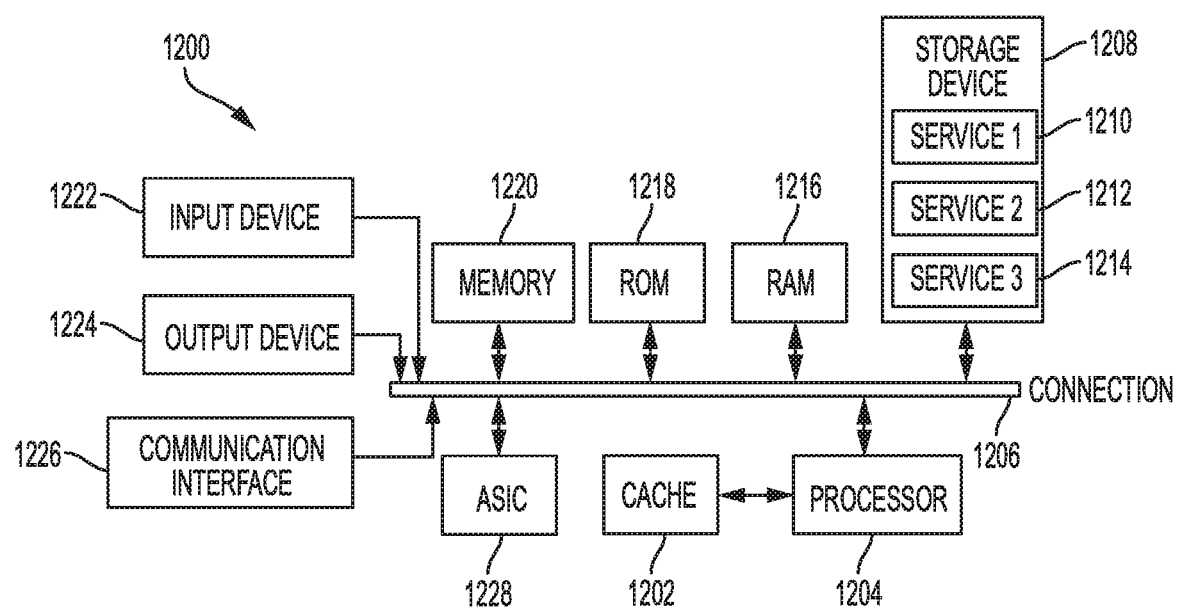
FIG. 12 illustrates an example system embodiment.

The disclosure begins with a description of example network environments and architectures which can be implemented for FaaS and serverless computing, as illustrated in FIGS. 1A, 1B, and 2. A discussion of FaaS and serverless computing and mechanisms for creating a distributed network of function execution environments, as illustrated in FIGS. 3-10, will then follow. The discussion concludes with a description of example devices, as illustrated in FIGS. 11 and 12, including various hardware components which can be used for performing computing operations. The disclosure now turns to FIG. 1A.

FIG. 1A illustrates a diagram of an example cloud computing environment 100. The environment can include a cloud 102. The cloud 102 can include one or more private cloud networks, public cloud networks, and/or hybrid cloud networks. The cloud 102 can include cloud elements 104-114. The cloud elements 104-114 can include, for example, servers 104, virtual machines (VMs) 106, software platforms 108, applications or services 110, software containers 112, and infrastructure resources 114 (e.g., storage, memory, CPU, network interfaces, etc.). The infrastructure 114 can include various types of hardware components or resources. For example, the infrastructure resources 114 can include compute resources, storage resources, network resources, management systems, controllers, routers, etc.

The cloud 102 can provide cloud computing services via one or more of the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

For example, the cloud 102 can host execution environments via elements 104-114 for FaaS and serverless computing. Clients or developers can store functions or any code on the cloud 102 for execution at the cloud 102 via elements 104-114 in response to a triggering event, such as a job request associated with the functions. The cloud 102 can host and manage elements 104-114 and the FaaS functions, which allows the specific client or developer to avoid having to manage the infrastructure and resources for the functions associated with the FaaS services provided by the cloud 102.

The local endpoints 116 can connect with the cloud 102 to obtain one or more specific services from the cloud 102. The local endpoints 116 can communicate with elements 104-114 via one or more public networks (e.g., Internet), private networks, and/or hybrid networks (e.g., virtual private network). The local endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of another example computing environment. In this example, the example computing environment is a fog computing environment 150. The fog computing environment 150 can include the cloud layer 154, which includes the cloud 102 and any other cloud system or environment, and the fog layer 156, which includes fog nodes 162. The local endpoints 116 can communicate with the cloud layer 154 and/or the fog layer 156.

The fog computing environment 150 can include one or more communication links 152 between the cloud layer 154, the fog layer 156, and the local endpoints 116. Communications can flow up to the cloud layer 154 and/or down to the local endpoints 116.

The fog layer 156 or "the fog" provides computation, storage and/or networking capabilities similar to cloud 102, but closer to the endpoints (e.g., local endpoints 116). The fog layer 156 can thus extend the cloud 102, or capabilities provided by the cloud 102, to be closer to the local endpoints 116. The local endpoints 116 can access data and/or resources from the fog layer 156 in addition to the cloud 102. The fog layer 156 can thus provide the local endpoints 116 with additional options for services and/or resources, which can be situated closer to the local endpoints 116 and may provide different performance, cost, latency, etc. In some cases, since the fog layer 156 is situated closer to the local endpoints 116 than the cloud 102, it can be associated with higher performance, lower latency, etc.

The fog nodes 162 in the fog layer 156 can represent fog devices, which can reside in one or more fog networks. In some examples, the fog nodes 162 can provide local or regional services and/or connectivity to the local endpoints 116. As a result, traffic and/or data can be offloaded from the cloud 102 to the fog layer 156 (e.g., via one or more fog nodes 162), which in some cases can provide faster services and/or connectivity to the local endpoints 116, as well as other advantages such as lower latency, security benefits from keeping the data inside the local or regional network(s), etc.

The fog nodes 162 can include any computing device with networking capabilities, such as servers, switches, routers, controllers, cameras, access points, kiosks, gateways, IoT devices, etc. Moreover, the fog nodes 162 can be deployed in any network and geographic location, such as a factory floor, a power pole, a railway track, a vehicle, an oil rig, an airport, an aircraft, a shopping center, a hospital, a park, a parking garage, a library, a street, etc.

Fog nodes 162 can be deployed within a network or as standalone or individual nodes. Moreover, one or more of the fog nodes 162 can be interconnected with each other via links 164, which can include network (e.g., wired and/or wireless) and/or electronic connections, for example. In some configurations, one or more fog nodes 162 can be deployed within specific fog instances 158, 160. The fog instances 158, 158 can be local or regional networks, such as local or regional fog networks, local or regional cloud networks, local or regional branch networks, etc. For example, the fog instances 156, 158 can be a regional cloud or data center, a local area network, a fog network, etc.

In some cases, one or more fog nodes 162 can be mobile nodes. The mobile nodes can move to different geographic locations, logical locations or networks, and/or fog instances while maintaining connectivity with the cloud layer 154, the fog layer 156, and/or the local endpoints 116. For example, a fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 illustrates a schematic block diagram of an example network architecture 200. In some cases, the architecture 200 can support and/or host the cloud 102. The architecture 200 includes a network fabric 212 with spine devices 202A, 202B, . . . , 202N (collectively "202") connected to leaf devices 204A, 204B, 204C, . . . , 204N (collectively "204") in the network fabric 212. Spine devices 202 and leaf devices 204 can be Layer 2 and/or Layer 3 devices, such as switches or routers. For the sake of clarity, they will be referenced herein as spine switches 202 and leaf switches 204.

Spine switches 202 connect to leaf switches 204 in the fabric 212. Leaf switches 204 can include access ports (or non-fabric ports) and fabric ports. Fabric ports can provide uplinks to the spine switches 202, while access ports can provide connectivity for devices, hosts, endpoints, VMs, external networks, etc., to the fabric 212.

Leaf switches 204 can reside in the fabric 212 and may reside in, or connect to, tenant or customer space. The leaf switches 204 can route and/or bridge the tenant packets and apply network policies. In some cases, a leaf switch can perform one or more additional functions, such as implementing a mapping cache, sending packets to the proxy function when there is a miss in the cache, encapsulate packets, enforce ingress or egress policies, etc.

In some cases, the leaf switches 204 can contain virtual switching and/or tunneling functionalities, such as a virtual tunnel endpoint (VTEP) functionalities. For example, the leaf switches 204 can connect the fabric 212 to a software defined or overlay network (e.g., VXLAN network). The leaf switches 204 can provide encapsulation and/or decapsulation of packets between the fabric 212 and one or more logical networks or segments.

Network connectivity in the fabric 212 can flow through the leaf switches 204. The leaf switches 204 can provide servers, resources, endpoints, external networks, containers, or VMs access to the fabric 212, and can connect the leaf switches 204 to each other. The leaf switches 204 can connect applications and/or endpoint groups ("EPGs") to other resources inside or outside of the fabric 212 as well as any external networks.

Endpoints 210A-E (collectively "210") can connect to the fabric 212 via leaf switches 204. For example, endpoints 210A and 210B can connect directly to leaf switch 204A, which can connect endpoints 210A and 210B to the fabric 212 and/or any other of the leaf switches 204. Similarly, endpoint 210E can connect directly to leaf switch 204C, which can connect endpoint 210E to the fabric 212 and/or any other of the leaf switches 204. Endpoints 210C and 210D can connect to leaf switch 204A and 204B via network 206. Moreover, the wide area network (WAN) 208 can connect to the leaf switches 204N.

Endpoints 210 can include any communication device or resource, such as a computer, a server, a cluster, a switch, a software container, a VM, a service appliance, a virtual computing environment, etc. In some cases, the endpoints 210 can include a server or switch configured with a virtual tunnel endpoint functionality which connects an overlay network with the fabric 212. For example, in some cases, the endpoints 210 can represent hosts (e.g., servers) with virtual tunnel endpoint capabilities, running virtual environments (e.g., hypervisor, virtual machine(s), containers, etc.) hosting virtual applications or devices in a logical network. An overlay network associated with the endpoints 210 can host physical devices, such as servers; applications; logical networks; virtual workloads; etc. Likewise, endpoints 210 can also host applications and virtual workloads, which can connect with the fabric 212 or any other device or network, including an external network.

Having disclosed example network environments and architectures, the disclosure now turns to a discussion of serverless computing and FaaS runtimes.

With serverless computing, developers or users can upload code to a computing system (e.g., serverless computing platform or environment), and the computing system can provision physical and/or virtual resources to run the code when necessary. The developer or user can avoid having to setup hosts or workers (i.e., networked hardware resources, including compute, storage, and network resources) to execute the code. The provider of the serverless computing environment can manage the resources, including when to start (and stop) using those resources, based on a specification of the computation to be executed. The underlying infrastructure is thus hidden to the developer or user, who does not need to purchase, provision, or manage the resources for executing the code.

Figure 3:
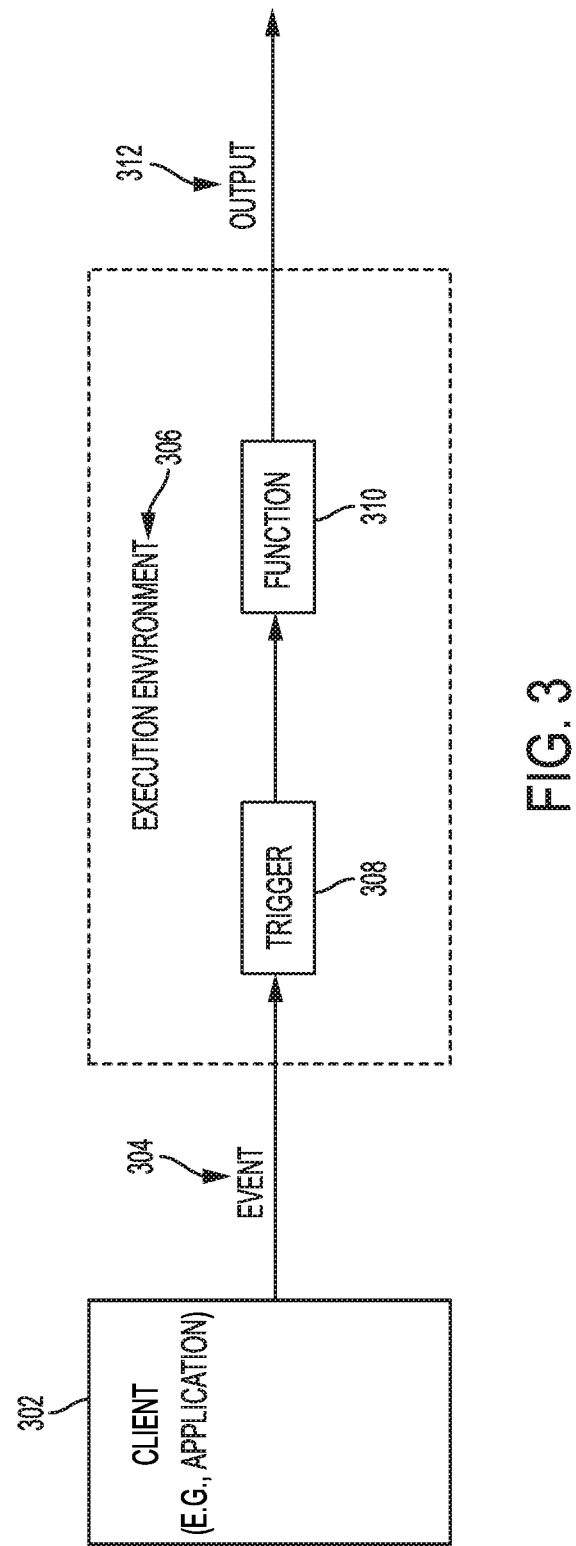
FIG. 3 illustrates an example flow for executing a function in an executing environment.

FIG. 3 illustrates an example diagram of a function executed in an example serverless configuration. In this example, an execution environment 306 can store a function 310 associated with a client 302 (e.g., application), which can be executed or computed when the execution environment 306 detects an event 304 that is defined as a trigger 308 for the function 310. In response to the trigger 308, the execution environment 306 can invoke or compute the function 310 to generate an output 312 based on the function 310. The function 310 can be invoked or computed in "real time" by the execution environment 306 after the event 304, based on the trigger 308. The client 302 can utilize compute resources on the execution environment 306 as necessary, or when necessary, to perform the function 310.

The execution environment 306 can have various compute resources and capabilities, such as one or more processors, storage devices, memory components, network interfaces, software containers, VMs, operating systems, applications, etc.; as well as one or more FaaS runtimes, which the execution environment 306 can use to access and perform the function 310 at specific times (e.g., on demand). The execution environment 306 can be hosted on a device, network, cloud, node (e.g., server, switch, etc.), an endpoint, a cluster of devices, etc. For example, the execution environment 306 can be hosted on the cloud 102 in network environment 100. As another example, the execution environment 306 can be hosted on the cloud layer 154, the fog layer 156, a fog node 162, a local endpoint 116, etc.

Figure 4:
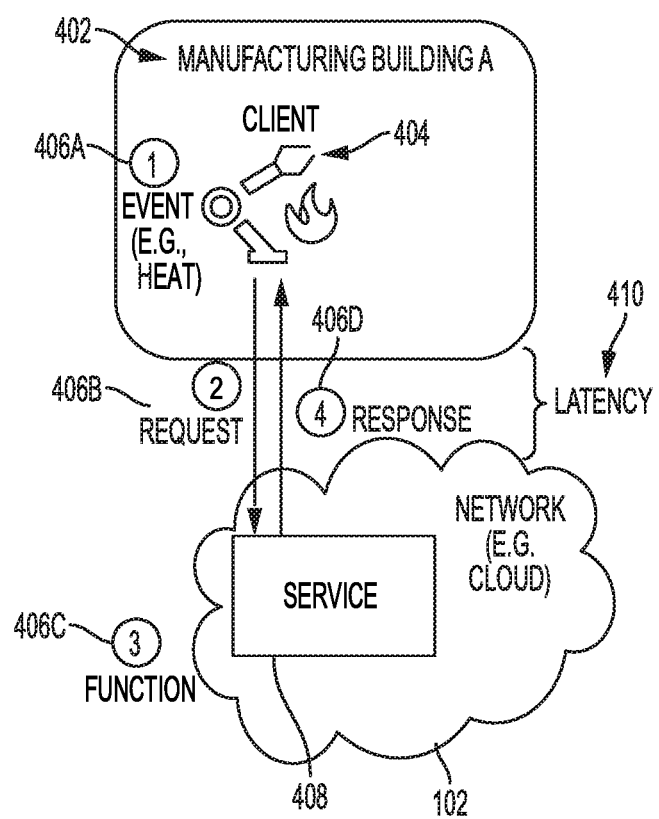
FIG. 4 illustrates a diagram of an example function-as-a-service (FaaS) use case.

FIG. 4 illustrates a diagram of an example FaaS use case. In this example, consider a robotic arm 404 on a factory floor 402 that has one or more sensors and communication interfaces to sense events and trigger function requests. For example, the robotic arm 404 contains an overheating sensor that is tripped when it detects a threshold amount of heat and/or fire. When the overheating sensor is tripped, the robotic arm 404 can detect an overheating event 406A. In response to the overheating event 406A, the robotic arm 404 can act as a client and make a call 406B (e.g., API call) to a service 408 (e.g., web service) running in cloud 102. The service 408 can receive the call 406B, execute a function 406C and provide a response 406D to the robotic arm 404. The response 406D can include data and instructions for the robotic arm 404.

In some cases, the response 406D can experience latency 410 when traversing between the robotic arm 404 and the cloud 102. The latency 410 can create a bottleneck in the response time of response 406D. The latency 410 can be due to the physical distance between the robotic arm 404 (client)

and the function 406C (e.g., the code or logic that provides instructions to the robotic arm 404 through the response 406D). In some cases, even if the function 406C executes or runs within an "edge" network, that "edge" network may still be physically and logically separated from the robotic arm 404 by a significant distance, which can lead to delays. Moreover, in some cases, the latency 410 can be a result of a lack or limit of adequate resources available on the cloud 102 for the function 406C. For example, the cloud 102 may not have the adequate resources available to execute the function 406C in a timely manner. This can result in a specific amount of network cost and compute latency.

To address these issues, a distributed network of function execution environments as described herein can be implemented to reduce cost and increase performance. For example, a distributed network of function execution environments can include execution environments on the cloud 102 as well as other networks or nodes, such as a fog node 162 or local endpoint 116. Thus, to reduce the latency 410, instead of executing the function 406C on the cloud 102, which can have infrastructure residing across one or more geographic locations (e.g., a city, state, country, etc.), the robot arm 404 may call the function 406C in a different node or network within a distributed network of function execution environments, which can provide a distributed, reliable, and trusted compute environment with a lower latency. Such node or network can be, for example, an execution endpoint in the same or a nearby location (e.g., building). The node or network can include an existing node or network (e.g., a previously deployed node or network), which may avoid a need to deploy a new network, server, data center, etc.

As will be described further below, the distributed network of function execution environments can be implemented as a function delivery network (FDN), which can aggregate devices, FaaS runtimes, frameworks, resources, etc., for hosting and executing functions. The FDN can provide various options for executing a function depending on specific needs, circumstances, etc. Accordingly, the FDN can provide improvements in latency, scale, and management for serverless and FaaS implementations.

For example, as illustrated above, latency 410 can create performance issues. The FDN can provide various options for executing function 406C and reduce latency 410. As will be further described below, the FDN can implement FaaS in event-driven architectures and environments, including IoT and mobile. Generally, as the function 406C is executed closer to the device or user, the overall latency may decrease, which leads to a better user experience. In an IoT application, the lower latency can result in higher performance IoT capabilities.

In some cases, latency and performance can be improved by a faster network or greater throughput. However, ultimately, as the execution environment is further away from the requesting user or device, the latency and delays will generally increase. The increased latency and delays can limit the usefulness of FaaS for "real time" use cases, such as IoT and Mobile. Thus, in order to reduce latency and increase performance, the FDN can execute a function in an execution environment selected for the specific request, which may be physically or logically closer.

Despite the name, "serverless" computing uses servers to implement functions. The need for servers can limit scaling. For example, serverless computing needs compute power to execute the functions. The on-demand nature of FaaS often requires adequate resources to be available to execute particular functions. This can create significant challenges for private cloud implementations of FaaS, which need to closely monitor and manage network and resource usage to ensure the network implements new compute hardware and properly adapts as FaaS usage grows.

For example, if an application receives a 'resource limit reached' error and the application is unable to run properly because the private cloud FaaS resource pool is not large enough to handle traffic spikes, developers may move away from the private cloud FaaS implementation. Instead, developers may switch to public cloud FaaS implementations or revert to traditional application architectures where resources are pre-allocated and often idly waiting for spikes. However, the public cloud FaaS implementations and traditional application architectures can also face significant problems and challenges, such as latency, cost, scalability, etc. The FDN described herein can address these and other issues. For example, the FDN can deliver a reliable pool of execution resources for private and/or hybrid implementations of FaaS. The FDN can provide a distributed and balanced approach that results in optimal performance, cost, scalability, etc., for FaaS.

Managing services and resources can also be a challenge in FaaS. For example, enterprises may face "FaaS Sprawl". The FDN can implement tools and platforms for tackling the runtime aspects of FaaS, and provide an integrated management platform for enterprises to enforce policies and gain visibility over a growing number of FaaS runtimes and execution environments. For example, FDN can include multiple FaaS execution environments. The FDN can route clients that request functions to specific FaaS execution environments that best meet the needs of the clients. The FDN can route the function request to the execution environment that is physically and/or logically closest to the requesting client, or select a specific execution environment based on one or more factors and/or policies, which can be defined by the client, network operator, etc.

Non-limiting examples of advantages and benefits provided by the FDN can include: 1) enforcement and reporting of IT policies defining the execution of functions, such as the who, what, where, when, and/or why for executing functions; 2) intelligent calculation of the 'best' route and target for executing a specific function for a specific client; and 3) dynamic routing of client function requests to selected execution endpoints.

The FDN can leverage existing resources in various locations. For example, offices, branch locations, manufacturing floors, retail locations, etc., typically have numerous systems connected to an associated network and are capable of executing functions. These systems have computing capabilities but often spend a considerable amount of time sitting idle. Examples of such systems include desktop and conference room collaboration endpoints, network devices, workstations, printers, kiosks, controllers, access points, IoT devices, etc. FDN can leverage these systems for FaaS, using the various computing resources as execution environments for FaaS.

FDN can be implemented by an intelligent function router. When a device or application (e.g., a client in this context) needs to execute a function, the device or application asks the function router for a location to execute the function. The function router can identify the "best" location for executing the function based on a set of customizable rules between the client and operator of the FDN environment and/or one or more factors such as load, network conditions, resource availabilities, etc.

Non-limiting examples of rules for selecting a location or device to execute a specific function can include distance, security or trust level, performance, cost, network conditions, performance patterns, etc. The function router can include a rules engine that provides the requesting device with a path to a selected execution target (e.g., the "best" execution target) for the requested function at the time the function is requested.

In some cases, network operators and security teams can set up the guardrails, and the teams developing the clients (applications) that will call the functions can add their own criteria within the pre-defined policy guardrails. For example, a temperature alert function may run on any endpoint because the primary goal is to get the alert out as fast as possible, but an inventory update function may only be executed on certain endpoints that meet a higher level of corporate security standards as security and accuracy may be more important in the context of inventory updates.

The function router can be delivered as-a-service, such as a network or cloud service. The function router maintains an inventory of devices capable of executing functions as specified by associated rules. The function router can handle any combination of local device endpoints (e.g., collaboration endpoints or idle workstations), private cloud endpoints, cloud-hosted FaaS services, etc. When a customer registers an individual endpoint or FaaS service with the function router, the customer can provide credentials for the function router, to securely load and unload functions on the endpoints dynamically based on, for example, client requests, function code updates, policy changes, endpoint availability, and other criteria that influence the dynamic function routing done by the function router.

The result is a distributed function routing platform which is dynamic. Recognizing that endpoints and services that are best able to execute a function at one time may not be the most suitable for executing the function at another time, the distributed function routing platform can intelligently select endpoints and services best suited to execute the function and can adapt as necessary when handling subsequent requests. Functions can be loaded and unloaded from the execution endpoints as different client applications (e.g., the robot arm 404, a mobile phone, an inventory scanner, etc.) need low latency compute options for their functions that fit the definition of "best" at the particular moment.

Consider the example in FIG. 4, where the robotic arm 404 needs to send requests for function 406C when the overheating sensor is tripped. In a distributed function routing implementation, when the robotic arm 404 detects that it is overheating, the robotic arm 404 can send a request to the function router. The request can identify the function that the robotic arm 404 needs to execute. For example, the request to the function router can include a unique ID of the function the robotic arm 404 is requesting. The function router can calculate the "best" endpoint to execute the function at the time of the request. The function will then be loaded on the endpoint, and the robotic arm 404 can be routed or redirected to the endpoint to execute the function.

The execution endpoints can be registered to allow the function router to perform distributed function routing and identify execution endpoints for specific function requests. The functions available in the distributed network can be included in the catalog to allow the function router to identify which functions are available for execution. For example, execution endpoints can be registered a catalog of functions and execution endpoints available in the distributed network. The execution endpoints in the catalog can be selected by the function router when searching for an execution environment to execute a particular function.

The registration of execution endpoints can allow the function router to know those execution endpoints are available as potential execution targets. As part of the registration of an execution endpoint, the function router can obtain credentials to manage the execution endpoint, along with details on where the execution endpoint is located as well as other endpoint characteristics, such as a security level of the execution endpoint, performance characteristics exhibit by the execution endpoint (e.g., runtime, etc.), and so forth. The function router can store such information in one or more storage locations, which can maintain information about the execution endpoints, such as location information, unique identifiers, function identifiers, runtime information, security information, availability information, cost information, performance information, etc.

Figure 5A:
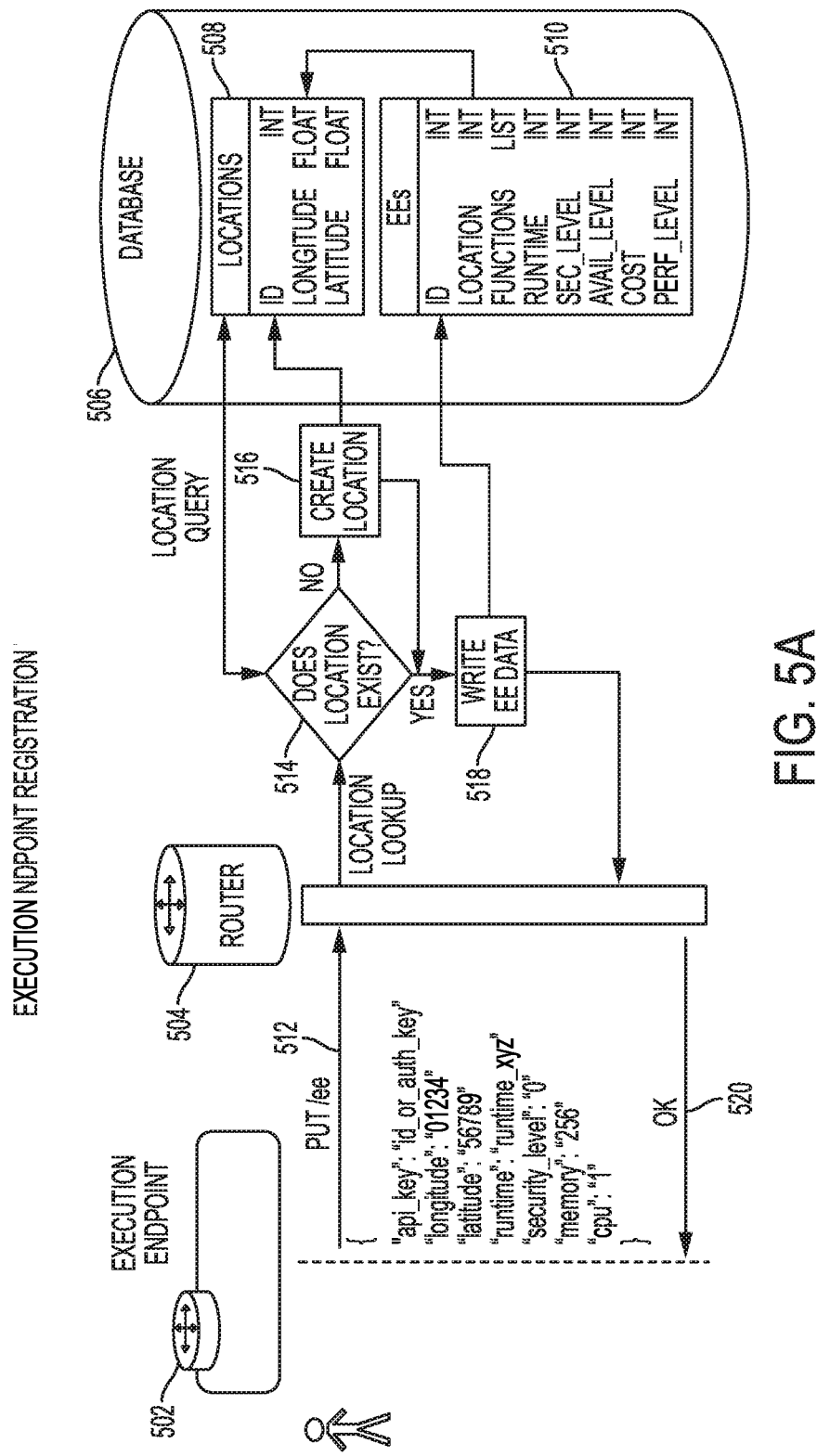
FIG. 5A illustrates an example flow for registering execution endpoints in a catalog for distributed function routing.

FIG. 5A illustrates an example flow for registering an execution endpoint 502 in a function delivery network (FDN). The registration of execution endpoint 502 can be managed by function router 504. The function router 504 can create and manage the FDN, as previously described. For example, the function router 504 can register execution endpoints and create a catalog of execution endpoints and functions, poll devices in the FDN for execution endpoint and function information, intelligently select execution endpoints for specific function calls or clients, intelligently route function calls or clients to selected execution endpoints, etc.

The function router 504 can include one or more physical and/or logical devices, applications, nodes, etc., configured to perform function routing capabilities as described herein. For example, the function router 504 can be implemented via one or more servers, network devices, VMs, software containers, clusters, controllers, virtualized network functions (VNFs), service function chains, etc. In some cases, the function router 504 can be a distributed function router implemented via function routers and/or function router components distributed across different locations. For example, function router 504 can be distributed across devices, networks, and/or environments, such as local networks, clouds, network devices, hardware clusters, application services, etc. In some cases, multiple function routers can be implemented in an FDN for greater performance, redundancy, etc. For example, the function router 504 can include one or more local function routers, one or more cloud function routers, one or more branch function routers, etc. A local function router or component can be implemented in addition to a cloud function router to provide load balancing, an API gateway, improved cold-start times across multiple execution endpoints, a robust pool of managed local execution endpoint resources, etc.

The function router 504 can maintain a database 506 of execution endpoints and functions in the FDN. The function router 504 can register execution endpoints to the database 506 in order to add the execution endpoints to the FDN. In FIG. 5A, the function router 504 registers execution endpoint 502 to the database 506 in order to add execution endpoint 502 to the FDN. The database 506 contains an execution endpoint information table 510 and a location information table 508. While the execution endpoint table 510 and location information table 508 are described as tables in a database in this example, other types of storage and/or data structures are also contemplated herein. The database 506 and tables 508, 510 are used herein for explanation purposes to illustrate an example storage structure or catalog for storing function routing information for the FDN.

The endpoint information table 510 can include, for example, information identifying execution endpoints (e.g., execution endpoint IDs), the location of the execution endpoints (e.g., the geographic location, the network location, the address, etc.), functions hosted by the execution endpoints (e.g., a list of functions), runtimes hosted by the execution endpoints, security levels, availability levels, cost levels, performance levels, etc. Moreover, the location information table 508 can include, for example, information identifying the locations of the execution endpoints, as well as one or more location details such as geographic locations, latitude/longitude information, distance information, etc.

To register execution endpoint 502 in the database 506, the function router 504 can receive a call 512 requesting registration of execution endpoint 502. The call 512 can include location and execution endpoint information associated with execution endpoint 502. For example, the call 512 can include authentication information for execution endpoint 502, a location of execution endpoint 502 (e.g., physical or geographic location, network location, address, latitude/longitude parameters, etc.), runtime information (e.g., runtime environment), security information, availability information, performance information, etc.

The function router 504 can receive the call 512 and use the information from the call 502 to perform a lookup 514 of the location and/or the execution endpoint 502 in the database 506. The function router 504 can perform the lookup 514 in the database 506 to determine if the location exists or the execution endpoint has already been registered. To perform the lookup 514, the function router 504 can query the database 506 (e.g., location information table 508) based on the location and/or execution endpoint information in the call 512.

If the location does not exist in the database 506, the function router 504 can create 516 the location by storing the location in the database 506. For example, the function router 504 can add the location to the location information table 508 in database 506. If the location exists, the function router 504 can write execution endpoint data 518 to the database 506. For example, the function router 504 can add execution endpoint data 518 to the execution endpoint information table 510 in the database 506. The execution endpoint data can include information about to the execution endpoint 502 included in the call 512.

The function router 504 can return a registration response 520 to the call 512. The registration response 520 can indicate that the execution endpoint 502 has been registered. In some cases, if the function router 504 encounters an error during the registration of the execution endpoint 502, the registration response 520 can indicate that an error has been encountered.

Figure 5B:
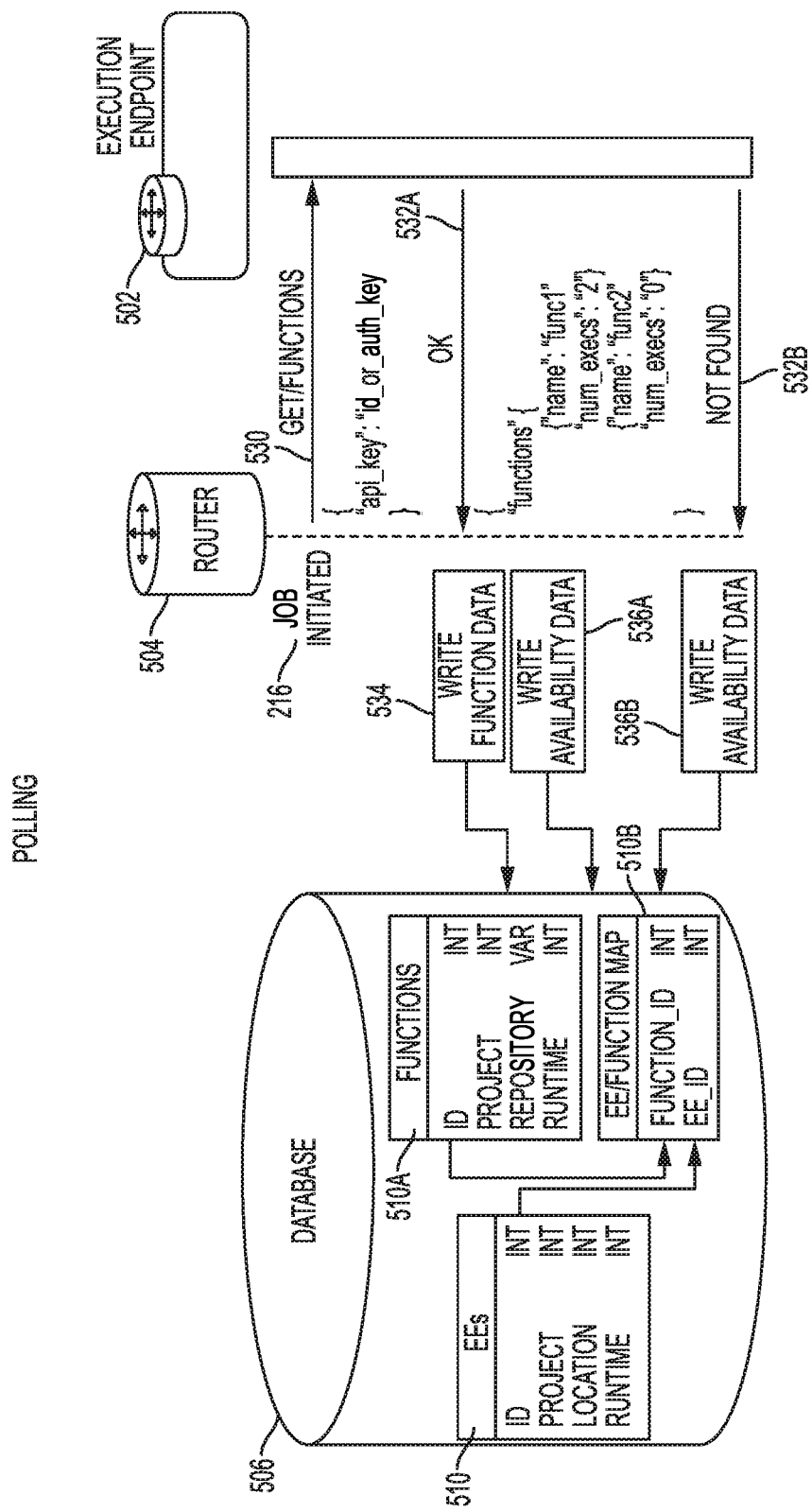
FIG. 5B illustrates an example flow for polling execution endpoints for information for distributed function routing.

The function router 504 can also poll each execution endpoint in the database 506 to obtain a measure of the execution endpoint's availability over time, and update the inventory of functions available across the execution endpoints. FIG. 5B illustrates an example process for polling execution endpoint 502 for information and updating the information in the database 506.

In this example, the function router 504 can send a polling request 530 to the execution endpoint 502. The polling request 530 can request information about the execution endpoint 502, such as availability, hosted functions, hosted runtime, location information, performance information, and/or any other information. In some cases, the polling request 530 can include authentication information, such as an authentication key, for execution endpoint 502.

In response to the polling request 530, the function router 504 can receive a polling response 532A or a polling error 532B. The polling response 532A can include information requested by the function router 504 in the polling request 530. For example, the execution endpoint 502 can send the polling response 532A to the function router 504, identifying the functions at the execution endpoint 502 and a number of times each of the functions at the execution endpoint 502 have been executed. If an error is encountered, the function router 504 can receive the polling error 532B indicating that the error has occurred (e.g., information has not been found or is not available).

The database 506 can maintain a function information table 510A. The function information table 510A can provide a catalog of functions, and can include information identifying specific functions and function details, such as function identifiers, function repositories, function runtimes, etc. The database 506 can maintain a function mapping information table 510B, which can associate specific functions in the function information table 510A with execution endpoints in the execution endpoint information table 510. Thus, the function mapping information table 510B can map execution endpoints in the execution endpoint information table 510 to specific functions in the function information table 510A. The database 506 can thus serve as a catalog of functions and execution endpoints, as well as related information such as locations, properties, etc. In this example, the function information table 510A and function mapping information table 510B are shown separate from the execution endpoint information table 510. However, in some examples, the execution endpoint information table 510 can include the execution endpoint information from table 510 as well as the function information from table 510A and mapping information from table 510B.

When the function router 504 receives the polling response 532A, it can write function data 534 and function availability data 536A to the database 506. For example, the function router 504 can write function data 534 and/or function availability data 536A to function information table 510A and/or function mapping information table 510B. Moreover, when the function router 504 receives polling error 532B, it can write availability data 536B to the database 506. The availability data 536B can indicate, for example, that an error has occurred, availability data is not available, an execution endpoint is not available, a function is not available, etc.

The function router 504 can poll execution endpoints periodically based on one or more factors such as a schedule, an event, a request, etc. As the function router 504 receives new information, such as new availability, function, or other execution endpoint information, it can update the database 506 to store such information in the execution endpoint information table 510, the function information table 510A and/or the function mapping information table 510B. This way, function and execution endpoint information for execution endpoints is updated as necessary to ensure the information is accurate and reflects any changes that have occurred.

Figure 5C:
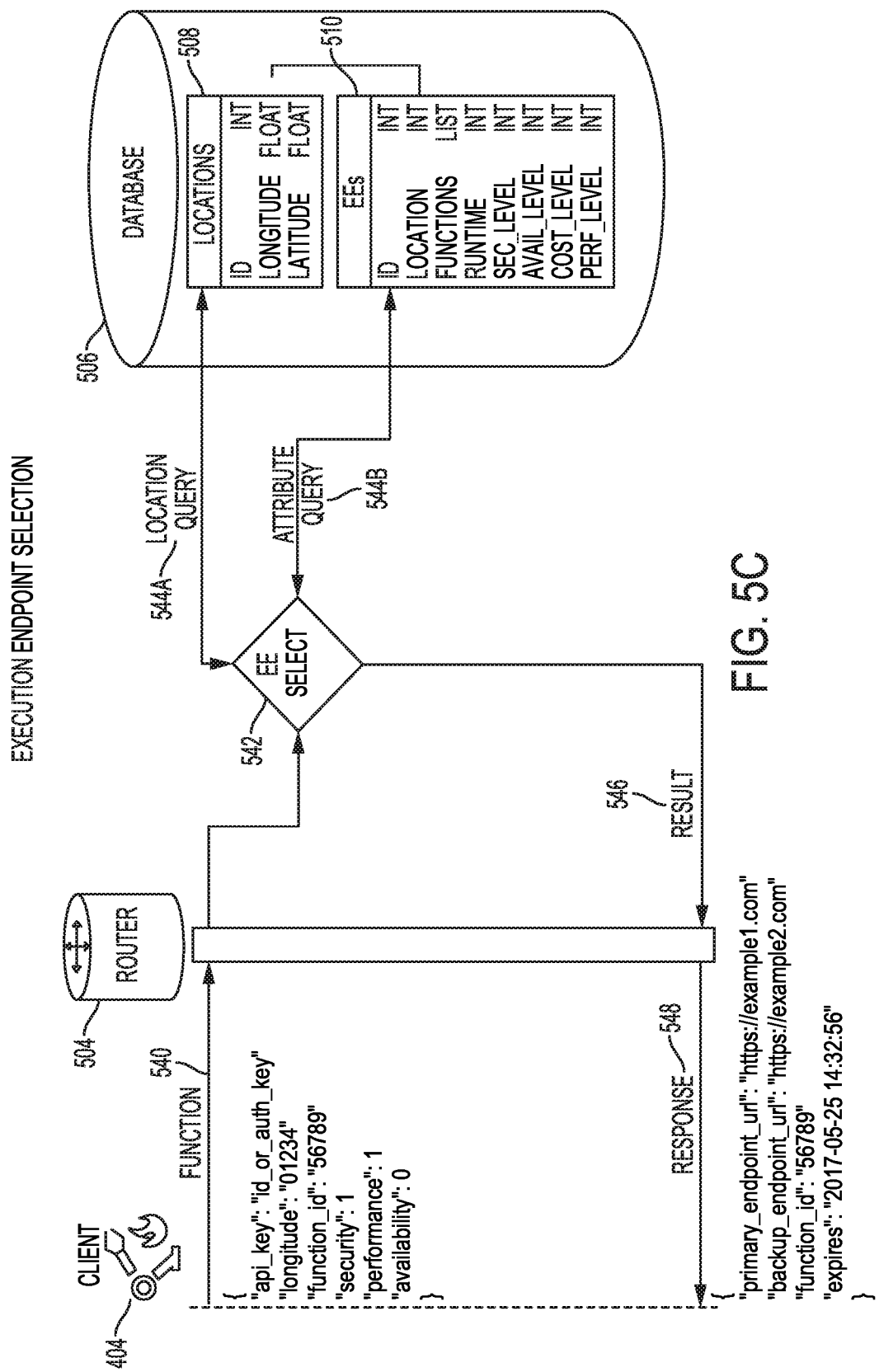
FIG. 5C illustrates an example flow for executing a function in a distributed function routing framework.

When a client (e.g., an application or device) needs to find an execution endpoint to contact for a function, the client can contact the function router 504, which can identify an execution endpoint for the function and route the client request to the identified execution endpoint. FIG. 5C illustrates an example process for identifying an execution endpoint for a function request from a client and routing the function request to the identified execution endpoint. For explanation purposes, the client in this example will be the robotic arm 404 shown in FIG. 4. However, it should be noted that the client can be any other application or device.

The robotic arm 404 first sends a call 540 to the function router 504 identifying a function requested by the robotic arm 404. The call 540 can include, for example, an authentication key, a function identifier for identifying the function, location information for identifying an execution endpoint hosting the function, availability information for the function, security information for function, performance information for the function, etc. The location information can include information about the location of the robotic arm 404 and/or the location of a target execution endpoint. For example, the location information can provide location details which can be used to identify an execution endpoint hosting the function based on a relative location of the robotic arm 404 and the execution endpoint. Moreover, the availability, security, and performance information can provide the rules, parameters, service requirements, etc., for the requested function.

The function router 504 receives the call 540 and performs an execution endpoint selection operation 542. The execution endpoint selection operation 542 can include a lookup of execution endpoints in database 506 and a selection of an execution endpoint hosting the particular function that meets any specific criteria for the call 540. For example, the execution endpoint selection operation 542 can include a location query 544A to the location information table 508 and an attribute query 544B to the execution endpoint information table 510. The function router 504 can perform the location query 544A and attribute query 544B to identify a suitable target for the function requested in the call 540. The location query 544A and attribute query 544B allows the function router 504 to search the catalog (e.g., database 506) for available execution endpoints and select the execution endpoint(s) that meets the criteria for the function and call 540.

The location query 544A can query geographic, physical, and/or network information in the database 506 which can be used to identify an execution endpoint based on the relative location of the robotic arm 404 and the execution endpoints hosting the function. The attribute query 544B can query the database 506 for specific attributes requested for the function, such as a performance level, an availability level, a security level, a specific runtime, a specific location, a specific function ID, etc.

Based on the location query 544A and attribute query 544B, the execution endpoint selection operation 542 generates a result 546 for the function router 504. The result 546 can include the execution endpoint selected for running the function. The function router 504 can notify the targeted execution endpoint (e.g., the execution endpoint selected by function router 504 and identified in the result 546) that the targeted execution endpoint has been selected to run the specific function requested in the call 540 for the specific client (e.g., robot arm 404). For example, the function router 504 can send a function execution request to the targeted execution endpoint identifying the function to run for the specific client and the location of the code for the function.

Once the function execution request is accepted by the targeted execution endpoint, the targeted execution endpoint can load the function (e.g., from a local or remote function repository), listen and wait for a request from the client (e.g., robotic arm 404), and activate a specific function endpoint address (e.g., URL) for when the next invocation of the function comes in from the client. The execution endpoint can also send the function endpoint address to the function router 504, which can include the address in a response 548 to the robotic arm 404.

Once the function router 504 has obtained the result 546 and any information from the execution endpoint (e.g., function endpoint address to the function), the function router 504 sends response 548 to the robotic arm 404. The response 548 can identify the execution endpoint selected for the particular function requested by the robotic arm 404. In some cases, the response 548 can include more than one selected execution endpoint. For example, the response 548 can include a primary execution endpoint and a backup or alternate execution endpoint.

The response 548 can also identify the function and an address associated with each execution endpoint in the response 548, such as a URL, a network path, an IP address, an HTTP redirect, etc. For example, the address can include a function endpoint address to the function, which the robotic arm 404 can use to request or invoke the function at the associated execution endpoint. In some cases, the response 548 can include a redirect (e.g., HTTP redirect) which redirects the client (e.g., robotic arm 404) to the execution endpoint selected to run the function.

The response 548 can also include an expiration period for the response 548. In some cases, when the expiration period lapses, the robotic arm 404 can be required to re-send the call 540 to function router 504 and obtain an updated response. The expiration period can be based on a time interval, a date, a counter, etc. The expiration period can indicate that the information in the response 548 is valid for, or expires after, a period of time. For example, the response 548 can include an expiration period identifying a date or time for requesting the function from the execution endpoint(s) identified in the response 548. Moreover, the expiration period can be defined by one or more events. For example, the expiration period can be set to a number of function calls. In this example, the expiration period can be reached when the number of function calls are generated or processed.

After receiving the response 548, the robotic arm 404 can obtain the address in the response 548 and use the address to contact the selected execution endpoint(s) and request execution of the function. The execution endpoint can be ready and waiting for the client's (e.g., the robotic arm 404) request to run the function. The robotic arm 404 can continue to make function calls to the execution endpoint selected by the function router 504 as the execution endpoint for the robotic arm 404. The selected execution endpoint can be selected by the function router 504 as the execution endpoint for the robotic arm 404 based on a determination that the execution endpoint can provide the best performance or satisfy specific criteria for running the function for the robotic arm 404. For example, in some cases, the execution endpoint can be the closest endpoint (physically and/or logically) to the robotic arm 404 (e.g., a local or regional execution endpoint). The closer proximity can limit or reduce network latency associated with the function calls and execution.

If the assigned execution endpoint becomes unavailable, the client (e.g., robot arm 404) can make a request (e.g., call 540) to the function router 504 for a new execution endpoint. The request can again trigger the process of locating an execution endpoint for the client (e.g., the 'best' execution endpoint), loading the function, redirecting the client to the newly-selected execution endpoint, etc., as previously described.

Figure 6A:
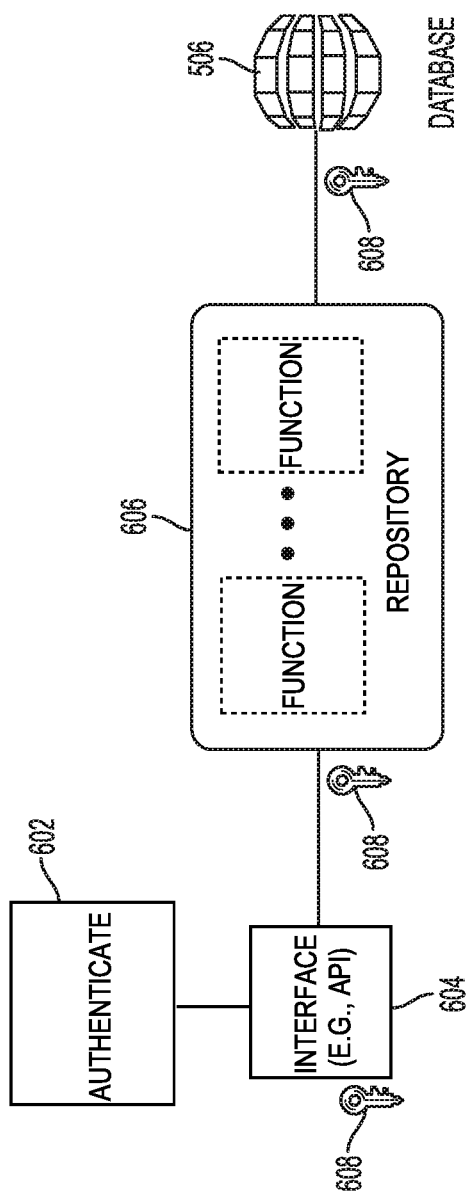
FIG. 6A illustrates a block diagram of an example platform architecture for distributed function routing.

FIG. 6A illustrates a block diagram of an example platform architecture for distributed function routing. The platform architecture in FIG. 6A is shown at a high level to illustrate a general framework for distributed function routing.

In general, distributed function routing can include a function router (e.g., function router 504) and one or more distributed execution endpoints. The function router provides control and visibility over a distributed and flexible collection of execution resources that are registered in, and monitored by, the function router. The distributed execution endpoints can provide the execution resources. The distributed execution endpoints can include one or more endpoints on the cloud 102 (e.g., endpoints 220), one or more endpoints on the fog layer 156 (e.g., fog nodes 162), one or more local endpoints (e.g., local endpoints 116), etc. As previously explained, the execution endpoints can be any devices or components hosting a runtime environment. For example, the execution endpoints can include one or more servers, VMs, software containers, IoT devices, access points, network cameras, kiosks, etc.

The distributed function routing can be implemented via the platform architecture shown in FIG. 6A. In this example, the platform architecture can include authentication element 602, API 604, repository 606, and database 506. The authentication element 602 can be an authentication and authorization service, such as AMAZON AWS COGNITO. The authentication element 602 can be used to authenticate an API from API 604, using one or more authentication keys 608, to interact with other components in the platform architecture. The API from API 604 can provide an interface for interacting with the function router, the repository 606, the database 506, and/or any other component in the platform architecture, in order to manage and access functions and function routing data.

The API 604 can include one or more APIs or interfaces for interacting with component in the distributed function routing architecture. In some cases, the API 604 can include an API service for creating, publishing, maintaining, monitoring, securing, and/or managing APIs at any scale. For example, the API 604 can include AMAZON API GATEWAY.

The repository 606 can include code (e.g., AMAZON AWS LAMBDA functions), configurations, components, etc., for the distributed function routing architecture. For example, the repository 606 can include the functions, APIs, user interface (UI) framework(s), documentation, etc., for the distributed function routing platform architecture.

The database 506 can store the information used for distributed function routing in the platform architecture. For example, as previously described, the database 506 can include execution endpoint information, location information, function information, distributed function routing parameters, client rules, execution endpoint and function mappings, etc.

The platform architecture can be managed using a serverless framework, such as the SERVERLESS.COM framework. For example, the deployment and configuration of functions and code, the authentication element 602, the API 604, the repository 606, and the database 506 can be managed using the SERVERLESS.COM framework.

The platform architecture can include a UI, such as a web UI, for the function router. The UI can use the same APIs used by a client to interact with the function router. The UI can run on one or more servers or endpoints.

Moreover, one or more sets of APIs can be built to manage different elements in the platform architecture. For example, CRUD (create, retrieve, update, and delete) can be implemented for execution endpoints, functions, clients, locations, users, etc. In addition, certain elements can be associated with each other, as further described below with respect to the data model in FIG. 6B. For example, an execution endpoint can be associated with a particular location.

Figure 6B:
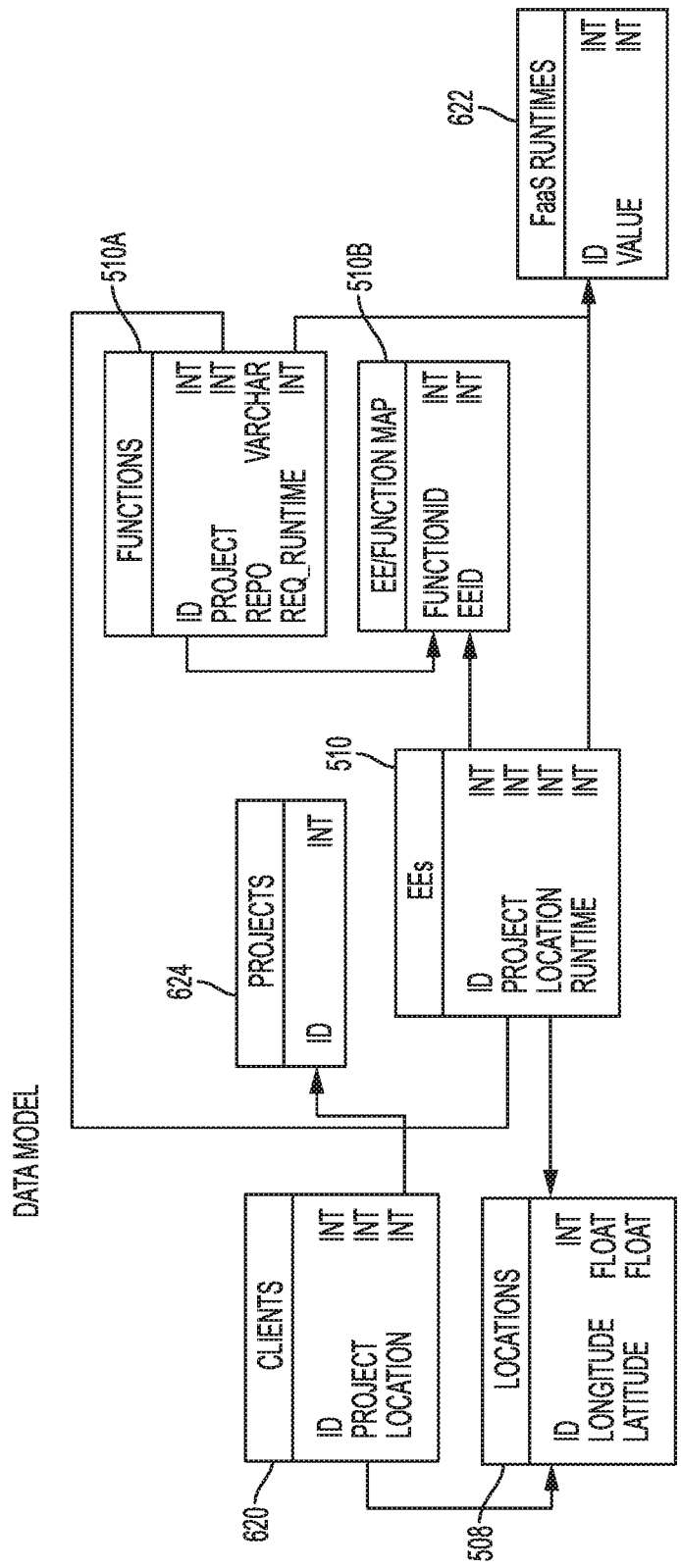
FIG. 6B illustrates an example data model for distributed function routing.

FIG. 6B illustrates an example data model for distributed function routing. The data model can be used by the function router 504 to access information about any execution endpoint, client function, etc. Based on the data model, the function router 504 knows about every execution endpoint, client, and function in the distributed function routing platform. Through the data model, the function router 504 can identify the physical or geographic location of any client and execution endpoint, as well as any associated metadata, and every function in the network. The function router 504 can use the data in the data model to decide which execution endpoint best meets the criteria for executing a client's function and redirect the client to the selected execution endpoint for execution of the client's function. The function router 504 can manage monitoring, logging, reporting, auditing, security, etc.

The data model can include location information table 508, execution endpoint information table 510, functions information table 510A, execution endpoint and function mapping table 510B, clients table 620, runtimes table 622, and projects table 624. The tables 508, 510, 510A, 510B, 620, 622, 624 can be used to locate information about any client, execution endpoint, function, runtime environment, location, project, etc. For example, tables 508, 510, 510A, 510B, 620, 622, 624 can serve as a catalog of clients, execution endpoints, functions, runtime environments, locations, projects, and any other information in the network.

The tables 508, 510, 510A, 510B, 620, 622, 624 can be used to identify, match or associate clients, execution endpoints, functions, runtime environments, locations, projects, etc. Using the tables 508, 510, 510A, 510B, 620, 622, 624, function router 504 can identify the location and identity of any client, the location and identity of any execution endpoint, the runtime environment hosted by a specific execution endpoint, the function(s) available for execution by a specific execution endpoint, the address of any client, the address of any execution endpoint and/or function, specific execution endpoint and/or function parameters, client requirements, etc.

For explanation purposes, the data model in FIG. 6B is depicted and described as a relational database with various tables storing data. However, it should be noted that the data model can include other structures and configurations.

Figure 7:
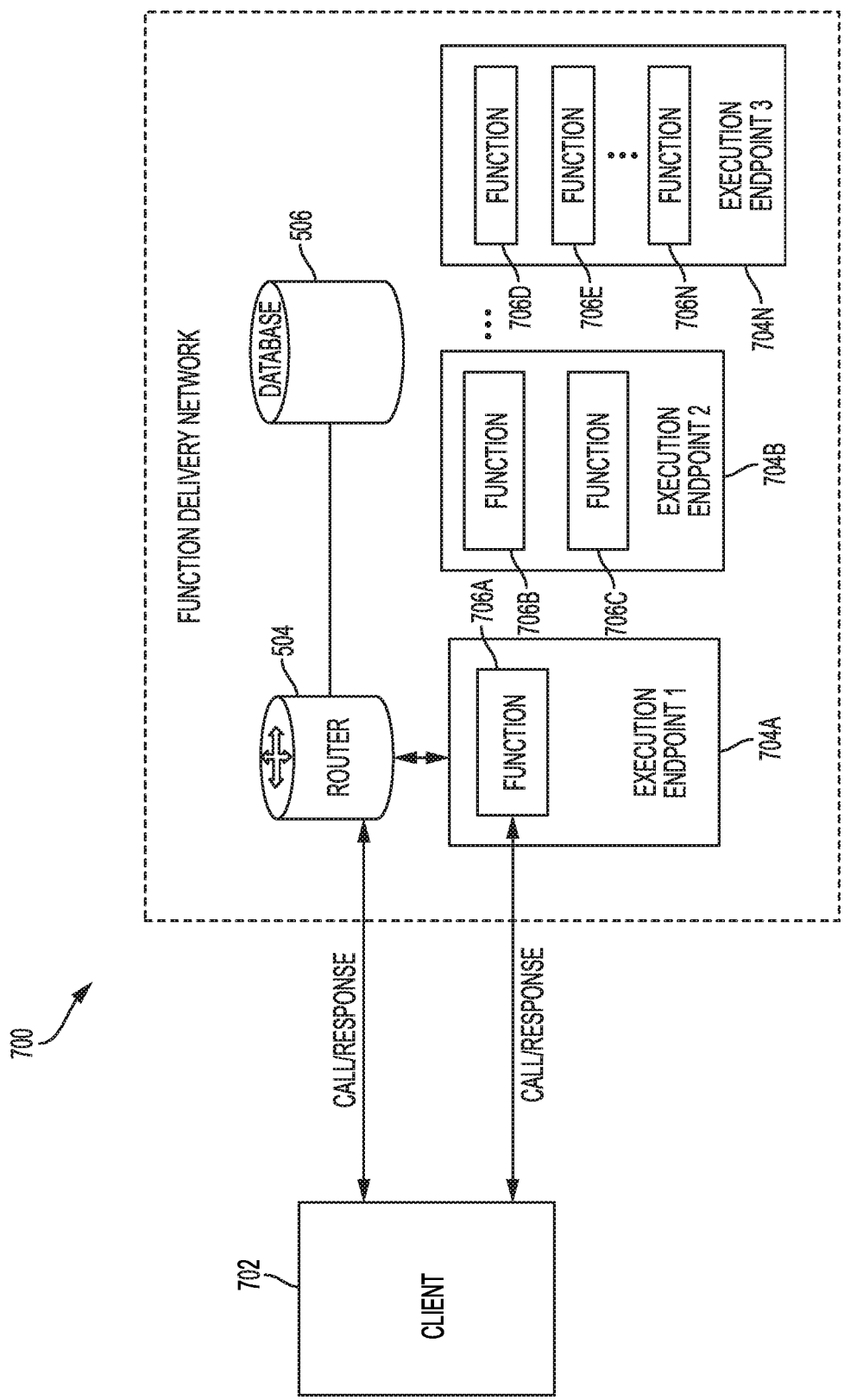
FIG. 7 illustrates a diagram of an example distributed function routing application in a function delivery network.
Figure 8:
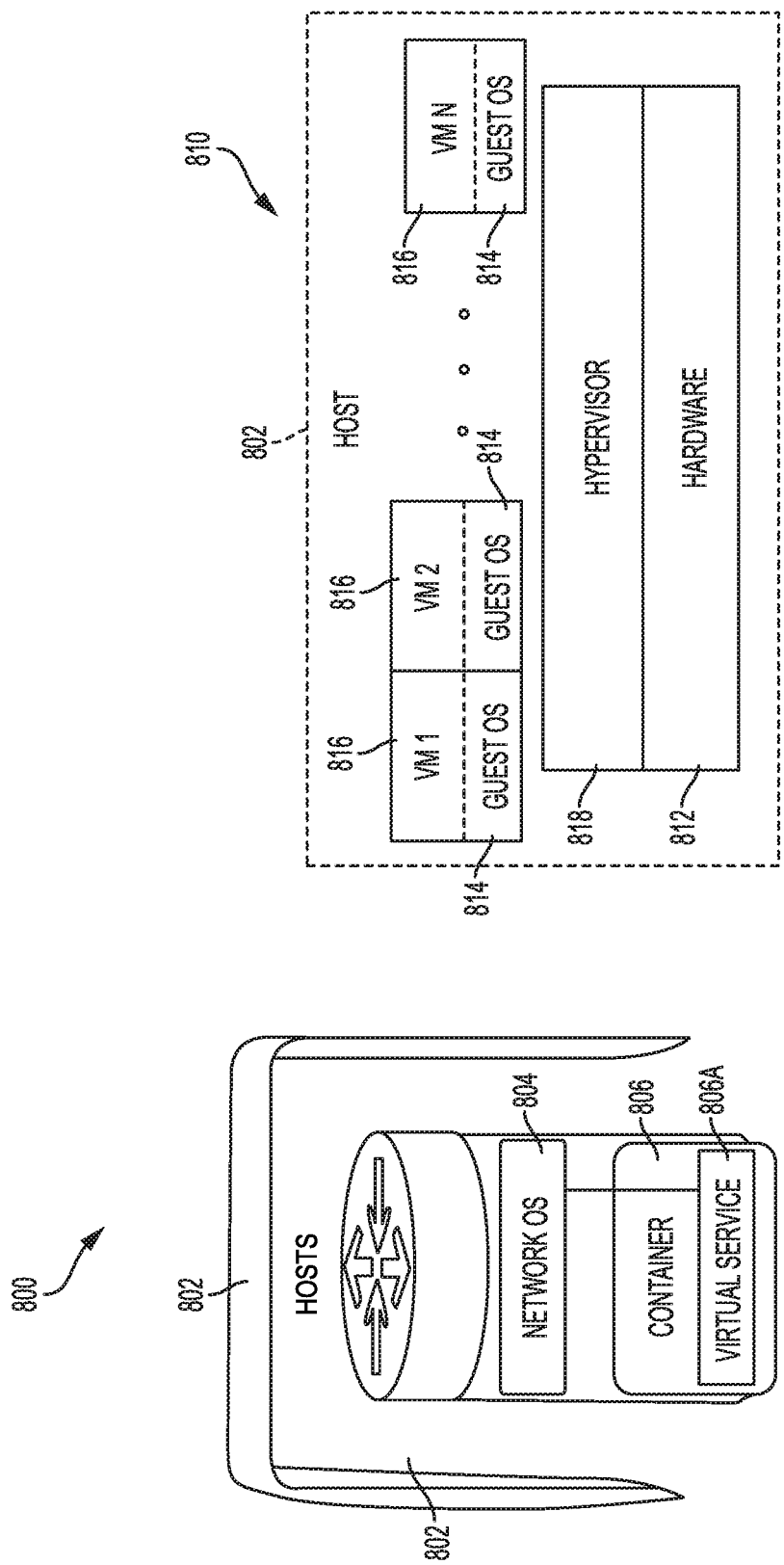
FIG. 8A illustrates an example platform for service containers.
FIG. 8B illustrates a schematic diagram of an example virtual machine (VM) deployment.

FIG. 7 illustrates a diagram of an example distributed function routing application in a function delivery network 700. The function delivery network 700 includes the function router 504, execution endpoints 704A, 704B, 704N (collectively "704"), and database 506. The execution endpoints 704 can reside in various network and/or geographic locations. For example, the execution endpoints 704 can include endpoints residing on the cloud 102, the fog layer 156, a local network, a regional network, an enterprise network, etc. In some examples, the execution endpoints 704 can include local endpoints 116, nodes 162, and/or endpoints on the cloud 102.

The execution endpoints 704 can run functions 706A, 706B, 706C, 706D, 706E, 706N (collectively "706") invoked upon request by a client. The functions 706 can include the code that runs when clients request execution of the functions 706. Each execution endpoint 704 can run one or more functions. In this example, execution endpoint 704A hosts function 706A, execution endpoint 704B hosts functions 706B, 706C, and execution endpoint 704N hosts functions 706D, 706E, 706N.

The functions 706 can include different functions and/or copies of a same function. For example, functions 706A, 706B, and 706D can represent the same function hosted or executed on different execution endpoints (i.e., execution endpoints 704A, 704B, 704N), and functions 706C, 706E, 706N can represent entirely different functions. Thus, the function delivery network 700 can include various execution endpoints 704A, 704B, 704N hosting or executing the same function (e.g., the function represented by functions 706A, 706B, and 706D). This way, when a function is requested by a client, the function router 504 has multiple execution endpoint options for executing the function, and can select the execution endpoint that best satisfies the criteria or requirements of the function request from the particular client.

The functions 706 can be uploaded or registered by one or more FaaS clients to the function delivery network 700. In some cases, the functions 706 can be stored in a repository of the function delivery network 700, such as repository 606 shown in FIG. 6A. For example, the functions 706 can be uploaded to repository 606 by one or more clients. Moreover, the functions 706 can be stored on the actual execution endpoints 704 for execution within respective runtime environments hosted by the execution endpoints 704, or retrieved by the execution endpoints 704 from the repository 606 when invoked.

The database 506 can include the execution endpoints 704 and functions 706 in the function delivery network 700, as well as any information used for identifying execution endpoints and functions and selecting an execution endpoint for a function, as previously explained. The database 506 can thus provide a catalog of execution endpoints and functions in the function delivery network 700, which the function router 504 can query to identify execution endpoints and functions in the function delivery network 700, select an execution endpoint to execute a requested function for a client, and route the client's request to the selected execution endpoint and function.

The function router 504 can receive function requests from a client 702 (e.g., robotic arm 404, an application, etc.) and select an execution endpoint in the function delivery network 700 to execute the function for the client. For example, the client 702 can send a call to function router 504 identifying a specific function that client 702 needs executed in the function delivery network 700. The call can request the function and include one or more parameters for the execution of the function, such as a runtime environment, a performance parameter, a security parameter, a cost, a latency threshold, a geographic location, etc. The one or more parameters can serve as criteria and/or requirements for the function and/or client 702.

The function router 504 can receive the call from the client 702 and query the database 506 for execution endpoint information, location information, function information, runtime information, performance parameters, etc. The function router 504 can query the database 506 to identify the functions in the function delivery network 700 and the execution endpoints available/capable of executing the specific function. The function router 504 can also query the database 506 to identify one or more parameters for selecting an execution endpoint, such as respective availabilities of execution endpoints associated with the function, respective performance parameters of execution endpoints associated with the function, respective physical or geographic locations of execution endpoints associated with the function, respective performance patterns of execution endpoints associated with the function, respective workloads of execution endpoints associated with the function, etc.

The function router 504 can use the queried information to identify the specific function and which execution endpoints host the specific function requested and are capable of running the function for the client. The function router 504 can select an execution endpoint (e.g., via execution endpoint selection operation 542) to execute the function based on any parameters or criteria associated with the function call from the client. The function router 504 can use the information queried from the database 506 to identify the execution endpoint that satisfies the parameters or criteria. Thus, the function router 504 can use the queried information to identify and select an execution endpoint in the function delivery network 700 that best meets the parameters or criteria for the function called by the client 702, such as a geographic proximity, an availability, a performance level, a security level, a load status, a cost level, etc.

For example, the client 702 can send to the function router 504 a call for a function represented by functions 706A, 706B, and 706D. The call can identify specific performance parameters for executing the function, such as latency parameters. The function router 504 can query the database 506 for information about the functions 706 and execution endpoints 704, and determine that the function is hosted on execution endpoints 704A, 704B, 704N. The function router 504 can also obtain from database 506 specific parameters for the function and/or execution endpoints 704A, 704B, 704N, such as execution endpoint performance parameters, execution endpoint security parameters, execution endpoint locations, execution endpoint availabilities, etc. The function router 504 can select a specific execution endpoint, such as execution endpoint 704A, based on the latency parameters identified in the call and the specific parameters for the function and/or execution endpoints 704A, 704B, 704N obtained from the database 506. The execution endpoint 704A can be selected by the function router 504 based on a determination that the execution endpoint 704 can meet the criteria (e.g., latency parameters) in the call from the client 702.

As another example, the client 702 can send to the function router 504 a call for a function represented by functions 706A, 706B, and 706D, and specify one or more cost and security parameters for executing the function. The function router 504 can perform an execution endpoint selection (e.g., execution endpoint selection operation 542) to find an execution endpoint that can run the function and meet the cost and security parameters for the client. For example, the function router 504 can query the database 504 to identify which execution endpoints host the function and identify cost and security parameters associated with the identified execution endpoint(s). The function router 504 can then select one or more execution endpoints for executing the function based on a determination that the selected one or more execution endpoints meet the criteria for executing the function for client 702 (i.e., the cost and security parameters).

In some cases, the function router 504 can identify multiple execution endpoints that satisfy one or more specific parameters or criteria for executing a function for a client. The function router 504 can send the multiple execution endpoints to the client in a response or select a subset of the multiple clients to include in the response to the client. For example, the function router 504 can identify multiple execution endpoints that satisfy a client's criteria and rank the multiple execution endpoints based on, for example, one or more respective parameters associated with the execution endpoints.

To illustrate, if the criteria for executing the function is a security level, the function router 504 can rank the execution endpoints based on respective security levels. The higher ranked execution endpoints can be those execution endpoints that more closely match the security level defined by the criteria and/or the execution endpoints having the higher security levels. For example, the execution endpoints can be ranked from the highest security levels or closest matches in security levels, to the lowest security levels or farthest matches in security levels. The function router 504 can then include the execution endpoints and ranks in the response to the client, or select a subset of execution endpoints (e.g., the highest ranked, the top N highest ranked, etc.) in the response to the client.

The examples above illustrate selections of execution endpoints based on latency, cost and security parameters. These parameters are non-limiting examples provided for explanation purposes. Other factors and/or parameters are also contemplated herein, such as other performance factors, availability, location or proximity, statistical information (e.g., execution statistics, performance statistics, etc.), patterns, etc.

As another example, assume the client 702 is an application configured to emulate a bar code scanner that talks to a backend API in order to get inventory information. In this example, the frontend of the application is a single page application (SPA) that resides on a device. The application has a product ID input field, a text area showing inventory results, and a response time text field.

The execution endpoints 704 are registered in the function delivery network 700 through the function router 504. The execution endpoints 704 host, and/or are capable of executing, respective functions 706. Assume functions 706A and 706B represent a product information lookup function configured to lookup product information in a JSON file and respond with product information associated with a specific product ID (e.g., the product ID entered in the product ID input field of the application).

When the application (702) needs to lookup product information for a product ID entered in the product ID input field of the application, the application can send a request to the function router 504 for the product information lookup function. Assume the request also identifies the specific product ID entered in the product ID input field of the application.

The function router 504 receives the request and performs a lookup in database 506. Based on the lookup, the function router 504 determines that the functions 706A and 706B match the product information lookup function (e.g., the functions 706A and 706B have a function ID matching the function ID of the product information lookup function). The function router 504 also determines that the functions 706A and 706B are hosted by execution endpoints 704A and 704B. The function router 504 can then select execution endpoint 704A and/or execution endpoint 704B for the request from the application (702). For example, the function router 504 can select the execution endpoint that is physically or geographically closer to the application (702).

In this example, assume that execution endpoint 704A is closer to application (702) than execution endpoint 704B. For example, execution endpoint 704A is an endpoint on the fog layer 156 (e.g., fog node 162) and the application (702) is hosted by another endpoint on the fog layer 156, while execution endpoint 704B resides on the cloud 102. In this example, the execution endpoint 704A and application 702 both reside on the fog layer 156 and are closer in proximity than the application (702) and execution endpoint 704B, which resides on the cloud 102. Function router 504 can determine, based on location information in the database 506, that execution endpoint 704A is closer to the application (702) than execution endpoint 704B, and execution of the function 706A on execution endpoint 704A will likely have a lower latency than execution of the function 706B on execution endpoint 704B. Accordingly, function router 504 can select execution endpoint 704A for the request from the application (702) instead of execution endpoint 704B, or otherwise ranked/prioritized higher than execution endpoint 704B.

The function router 504 can then send a response to the application (702) identifying the execution endpoint 704A and function 706A. The response can include an address or redirect (e.g., URL, HTTP redirect, IP address, etc.) for invoking the function 706A on the execution endpoint 704A. For example, the response can include an execution endpoint function address for accessing or invoking function 706A on the execution endpoint 704A. The application (702) can receive the response identifying the execution endpoint 704A and function 706A and/or any other information for invoking the function 706A on the execution endpoint 704A, and use the response (or the information in the response) to call or invoke the function 706A on the execution endpoint 704A.

The execution endpoint 704A can receive the call and execute the function 706A. The function 706A can then perform a product information lookup in a JSON file based on the specific product ID (e.g., the product ID entered in the product ID input field of application 702), and respond to the application (702) with the product information associated with the specific product ID.

In FIG. 7, the function router 504 is shown as a single function router. However, in some configurations, the function router 504 can be a distributed function router having function router components (e.g., hardware, software, applications, functions, VMs, containers, etc.) or function router instances across different networks, devices, data centers, etc. Moreover, in some configurations, the function delivery network 700 can be implemented using a plurality of function routers. The plurality of function routers can reside in one or more locations or networks. For example, the plurality of function routers can include one or more local function routers on one or more local networks or regional locations, one or more cloud function routers, one or more geographically-situated function routers, etc. In some cases, the one or more local function routers can serve local clients for better performance, security, etc.

In some cases, the function delivery network 700 can include a plurality of function routers used to intelligently select a best function router (e.g., closest, available, cheapest, etc.) for each client. For example, clients can be mapped or routed to respective function routers selected for the clients based on one or more factors, such as proximity, latency, cost, performance, availability, security, etc. Thus, a client residing in Branch A can be served by a function router residing in Branch A, and a client residing in Region B can be served by a function router residing in Region B and/or closest to Region B. The plurality of function routers can also be used to load balance clients and/or function requests. For example, a client residing in Branch A can be served by a function router residing in Branch A. However, if the function router residing in Branch A is overloaded, unresponsive, busy, slow, unavailable, etc., a different function router can be selected to serve the client based on one or more factors, such as availability, load, latency, etc. The different function router may also reside in Branch A or may reside in a remote network or location, such as the cloud 102 or Region B.

In some cases, local function routers can be used to expand the distributed function routing operations and provide additional benefits, such as performance and failover. As FaaS installations expand onto a wider variety of execution endpoints, local function routers can be implemented having a local presence with a public address (e.g., public IP), to manage execution endpoint and function inventories and proxy API calls so clients can be less intelligent or to offload operations from the clients. Local function routers can also enable sophisticated failover configurations, as local function routers may be less sensitive or prone to latency.

Some configurations can implement intelligent function pre-installation, single command setup of endpoints, role-based access control (RBAC), enhanced logging, etc. For example, intelligent function pre-installation can be implemented based on telemetry data, which can be used to intelligently pre-install functions on one or more execution endpoints. Moreover, with single command setup of endpoints, a setup command can fetch the endpoint code, query the capabilities of the endpoint, add the endpoint to an execution endpoint account, register the endpoint as an execution endpoint in the function routing catalog (e.g., database 506), etc.

Having described an example distributed function routing application in the function delivery network 700, the disclosure now turns to a discussion of various example features and aspects of distributed function routing in the function delivery network, including function related features, client related features, location related features, and user related features.

Distributed Function Routing

When a function is registered in the function router 504, the function can automatically resolve to a route (e.g., URL), such as https://functionrouter.com/run/{function_id}. Assuming an authenticated client makes a request to the route (e.g., the example URL) with a valid function ID, the client can be authorized to interact with the function router 504, and the function router 504 can begin or continue the process of finding an execution endpoint (e.g., the 'best' execution endpoint) to execute that function. Below is an example process which can be triggered for finding an execution endpoint.

The function router 504 locates an execution endpoint, such as the "best" execution endpoint. The function router 504 uses the credentials it has for that execution endpoint to notify the execution endpoint that the client is authorized to execute the specific function, function_ID, on the execution endpoint. The function router 504 instructs the execution endpoint to fetch the correct function code from storage and/or a repository (e.g., repository 606). The execution endpoint's runtime loads the specific function code and prepares it for execution. The execution endpoint's runtime creates the API endpoint or interface for the function. The execution endpoint's runtime responds to the function router 504 with the API endpoint for the now-ready function.

The function router 504 responds to the original client request with an address or redirect (e.g., HTTP redirect), which corresponds to the address (e.g., URL) of the API endpoint on the execution endpoint. The client calls the specific function API of the execution endpoint for future requests to execute that function. If the client encounters a problem running the function on that particular execution endpoint, the client can start the process of locating another execution endpoint by making a request back to the function router 504.

Below is a description of example APIs and features relating to functions, users, locations, and execution endpoints in distributed function routing.

Functions

The distributed function routing platform can implement various function API methods. Non-limiting examples of API methods include:

POST/function—Adds new function to the Manager Catalog or database;

GET/function—Lists functions in the Manager Catalog or database;

GET/function/{function id}—Lists a specific function;

PUT/function/{function id}—Updates a specific function; and

DELETE/function/{function id}—Removes a specific function.

Registering a New Function

Registration of a new function can provide the details of a function that an authorized client may execute in the system. The registration can be an API call for authorized users. The input can include a text name, text description, an address of a repository (e.g., URL associated with repository 606) where the function code resides, etc. Successful creation of a function can return data or objects, such as JSON objects, with the details of the new function and the unique ID of that function.

Listing Functions

An authenticated user can call an API to retrieve a list of active functions on the user's account, and the details about the functions, such as a name, description, function ID, etc. The API method can thus request a report of the functions and associated details on the user's account.

Deleting a Function

An API method can be used to delete a specific function by unique ID. When the specific function is deleted, it can be removed from storage or associated with a delete flag or parameter. For example, a delete operation may not actually delete the function but instead place a date in a 'deleted' field associated with the function (e.g., a deleted field for the function on database 506). In some cases, any function associated with deleted field that is not null can be treated as deleted.

Viewing a Function

An API method can be used to view details of a specific function by unique ID. The API method can retrieve function details as described in the listing of functions but limited to a specific function ID, such as function name, description, repository location for the function code, etc. The API method can thus request a report of details for an individual function.

Editing a Function

An API method can be used to update a specific function by unique ID. In some cases, any values passed in the body can be updated in the database 506. The response can return success and an output of updated details of a specific function.

Clients

A client can be an application or device that calls functions in the distributed network of execution functions (e.g., function delivery network 700). Non-limiting examples of client API methods can include:

POST/client—Adds a new client to the function router 504;

GET/client—Lists all clients known to the function router 504;

GET/client/{id}—Lists a specific client;
PUT/client/{id}—Updates a specific client; and
DELETE/client/{id}—Removes a specific client.

Registering a Client

Registering a new client provides the details of a client that will make requests for functions in the system. The registration can be performed via an API call for authorized users. The input can include a text name, text description, client type ID, location ID where the client resides, etc. For clients flagged as mobile, the location can be left blank and passed when the client makes a request to the function router 504. Successful creation of a client can return data or objects with the details of the new client and the unique ID of that client.

Listing Clients

An authenticated user can call an API to retrieve a full list of all active clients on the user's account, as well as any details about the clients, such as a name, description, client ID, client type, location ID, etc.

Deleting a Client

An API method can be used to delete a specific client by unique ID. In some cases, deleting a client may not actually delete the client but rather place a date in a 'deleted' field associated with the client. A client with a deleted field that is not null can be treated as deleted.

Viewing a Client

An API method can be used to view details of a specific client by unique ID. The details can include any information associated with the specific ID, such as a client name, description, ID, client type, location ID, etc.

Editing a Client

An API method can be used to update a specific client by unique ID. Any values passed in the body can be updated in the database 506. The response can return success and an output of the updated details of the specific client.

Execution Endpoints

Execution endpoints can be tracked and coordinated by the function router 504. An execution endpoint can be a single compute resource (e.g., a standalone endpoint), a larger FaaS platform (a cluster), an FaaS service (e.g., AWS LAMBDA), etc. In any case, the execution endpoint can be treated as a single "thing" that the function router 504 has credentials to access.

Non-limiting examples of execution endpoint API methods can include:

POST/ee—Adds a new execution endpoint to the function router 504;
GET/ee—Lists all execution endpoints known to the function router 504;
GET/ee/{id}—Lists a specific execution endpoint;
PUT/ee/{id}—Updates a specific execution endpoint; and
DELETE/ee/{id}—Removes a specific execution endpoint.

Creating an Execution Endpoint

Creation of an execution endpoint provides the details of an execution endpoint that will execute function code. The execution endpoint can be created via an API call for authorized users. The input can include, for example, the execution endpoint's text name, text description, runtime ID, and location ID where the execution endpoint resides, parameters, etc. In some examples, additional metadata about the execution endpoints can be stored such as performance, security, platform details, runtime, availability, cost, etc. Successful creation of an execution endpoint returns the known details of the new execution endpoint and the unique ID of that execution endpoint.

Listing Execution Endpoints

An authenticated user can call an API to retrieve a list of active execution endpoints on the user's account, as well as any details about the execution endpoints, such as a name, description, execution endpoint ID, runtime ID, location ID, functions the execution endpoint has loaded, etc.

Deleting an Execution Endpoint

An API method can delete a specific execution endpoint based on a unique ID. In some cases, the execution endpoint may not be actually deleted. Instead, a date can be added to a 'deleted' field associated with the execution endpoint to cause the execution endpoint to be treated as deleted. Any execution endpoint with a deleted field that is not null can be treated as deleted.

Viewing an Execution Endpoint

An API method can be used to view details of a specific execution endpoint based on a unique ID. The details can include a name, description, execution endpoint ID, location ID, functions loaded at the execution endpoint, etc.

Editing an Execution Endpoint

An API method can update a specific execution endpoint by unique ID. Any values passed in the body can be updated in the database 506. A response can return success and an output of updated details of a specific execution endpoint.

Locations

A location can be a physical place where a client or execution endpoint resides. Clients that are mobile may not have a static location assigned to them. Non-limiting examples of location API methods include:

POST/location—Adds a new Location to the function router 504;
GET/location—Lists all locations known to the function router 504;
GET/location/{id}—Lists a specific location;
PUT/location/{id}—Updates a specific location;
DELETE/location/{id}—Removes a specific location.

Creating a Location

Creating a location provides the details of a location where clients and execution endpoints can reside. The location can be created via an API call for authorized users. The input can include, for example, the location's text name, text description, latitude, longitude, etc. Successful creation of a location can return the known details of the new location and the unique ID of that location. A new location can then be associated with at least one client or execution endpoint.

Listing Locations

An authenticated user can call an API to retrieve a list of active locations on the user's account, as well as any location details such as a name, description, location ID, latitude, longitude, clients in the location, execution endpoints in the location, etc. The response can provide a report of locations.

Deleting a Location

An API method can be used to delete a specific location by unique ID. In some cases, deleting may not actually delete the location but rather add a date in a 'deleted' field. Any location with a deleted field that is not null can be treated as deleted.

Viewing a Location

An API method can be used to view details of a specific location by unique ID. The details can include, for example, a location name, description, location ID, latitude, longitude, clients in the location, execution endpoints in the location, etc. The response can provide a report of the location details.

Editing a Location

An API method can be used to update a specific location by unique ID. Any values passed in the body can be updated in the database 506. The response can return success and an output of updated details of a specific location.

Users

Users may have several levels of access. For example, calling the user APIs may require administrative access. All other APIs may require a general user account. Some examples may include fine-grained RBAC. Authentication and authorization of APIs can be handled on the backend and enforced by an API Gateway, an FaaS (e.g., LAMBDA), a database 506, etc. User API methods can include:

POST/user—Adds a new user to the function router 504;
GET/user—Lists all users known to the function router 504;
GET/user/{id}—Lists a specific user;
PUT/user/{id}—Updates a specific user;
DELETE/user/{id}—Removes a specific user.

Creating a User

A user may call APIs on the function router 504 to manage locations, clients, functions, execution endpoints, other users, etc. The user can be created via an API call for authorized users. The input can include, for example, the user's name, text description, email address, a flag for access levels, etc. Successful creation of a user returns the known details of the new user and the unique ID of that user.

Listing Users

An authenticated user can call an API to retrieve a list of active users on the user's account, as well as any user details such as a name, description, email, administrator flag, etc.

Deleting a User

An API method can be used to delete a specific user by unique ID. In some cases, deleting may not actually delete the user but rather add a date in a 'deleted' field of the user. Any user with a deleted field that is not null can be treated as deleted.

Viewing a User

An API method can be used to view details of a specific user by unique ID. The details can include, for example, the user's name, description, email, administrator flag, etc.

Editing a User

An API method can be used to update a specific user by unique ID. Any values passed in the body can be updated in the database 506. The response can return success and an output of updated details of a specific user.

FIG. 8A illustrates an example platform 800 for service containers. The service containers can host a runtime environment for executing functions, host and/or execute one or more functions, host and/or execute one or more applications or services (e.g., distributing function routing services), and so forth. Service containers use virtualization technology (e.g., LXC, KVM, etc.) to provide a hosting environment on hardware resources (e.g., servers, routers, computing devices, etc.).

In this example, a container 806 is stored on host 802. The host 802 can be, for example, a network device (e.g., router, switch, controller, function router 504, etc.), a server, a computer, an execution endpoint, or any other computing host. The container 806 can provide an execution environment for an application, which can provide a virtual service 806A. The host 802 can host an operating system (OS) 804 which hosts and executes the container 806, and manages communications and operations between hardware and software components on the host 802.

For explanation purposes, the host 802 in this example includes a single container. However, the host 802 can host additional containers. For example, the host 802 can include a plurality of containers. The plurality of containers can execute on the same kernel of the host 802, thus sharing most or all of OS 804.

In some examples, the container 806 can host and/or execute one or more functions, such as functions 706. For example, the host 802 can be an execution endpoint, such as execution endpoint 704A, and the virtual service 806A can represent a service provided by function 706A on execution endpoint 704A. In this example, the container 806 can host an execution environment for the function 706A, and execute the function 706A through the execution environment when the function 706A is invoked, to provide the virtual service 806A to a client (e.g., application 702, robotic arm 404, etc.).

FIG. 8B illustrates a schematic diagram of an example virtual machine (VM) deployment 810. In this example, the host 802 can include one or more VMs 816. The VMs 816 can be configured to run workloads (e.g., applications, services, processes, functions, etc.) based on hardware resources 812 on the host 802. The VMs 816 can run on guest operating systems 814 on a virtual operating platform provided by a hypervisor 818. Each VM can run a respective guest operating system which can be the same or different as other guest operating systems associated with other VMs on the host 802. Moreover, each VM can have one or more network addresses, such as an internet protocol (IP) address. The VMs 816 can communicate with hypervisors 818 and/or any remote devices or networks using the one or more network addresses.

Hypervisors 818 can be a layer of software, firmware, and/or hardware that creates and runs VMs 816. For example, the hypervisors 818 can be virtual machine managers (VMM) for hosting and managing the VMs 816. The guest operating systems running on VMs 816 can share virtualized hardware resources created by the hypervisors 818. The virtualized hardware resources can provide the illusion of separate hardware components. Moreover, the virtualized hardware resources can perform as physical hardware components (e.g., memory, storage, processor, network interface, etc.), and can be driven by the hardware resources 812 on the host 802. Hypervisors 818 can have one or more network addresses, such as an internet protocol (IP) address, to communicate with other devices, components, or networks. For example, the hypervisors 818 can have a dedicated IP address which they can use to communicate with VMs 816 and/or any remote devices or networks.

Hardware resources 812 can provide the underlying physical hardware driving operations and functionalities provided by the host 802, hypervisors 818, and VMs 816. Hardware resources 212 can include, for example, one or more memory resources, one or more storage resources, one or more communication interfaces, one or more processors, one or more circuit boards, one or more extension cards, one or more power supplies, one or more antennas, one or more peripheral components, etc. Additional examples of hardware resources are described below with reference to FIGS. 11 and 12.

The host 802 can also include one or more host operating systems (not shown). The number of host operating system can vary by configuration. For example, some configurations can include a dual boot configuration that allows the host 802 to boot into one of multiple host operating systems. In other configurations, the host 802 may run a single host operating system. Host operating systems can run on hardware resources 812. In some cases, a hypervisor 818 can run on, or utilize, a host operating system on the host 802.

The host 802 can also have one or more network addresses, such as an internet protocol (IP) address, to communicate with other devices, components, or networks. For example, the host 802 can have an IP address assigned to a communications interface from hardware resources 812, which it can use to communicate with VMs 816, hypervisor 818, switches, and/or any remote devices or networks.

In some examples, the host 802 can be an execution endpoint, such as execution endpoint 704A, and the VMs 816 can host execution environments for respective functions, such as functions 706. For example, VM 1 can host an execution environment for function 706A, and can execute function 706A when invoked by a client as previously described.

In some examples, the host 802 can run a distributed function router, such as distributed function router 504. For example, the host 802 can run distributed function router 504. Host 802 can run distributed function router 504 via one or more of the VMs 816. For example, host 802 can run distributed function router 504 on VM 1. In some cases, the distributed function router 504 can be distributed across multiple VMs 816. For example, VMs 816 on host 802 can host and execute one or more functionalities of the distributed function router 504. In some cases, host 802 can also host multiple distributed function routers via VMs 816. For example, VM 1 can host and run a first distributed function router and VM 2 can host and run a second distributed function router. The first and second distributed function routers can be different function routers or may be instances of a same function router which can be configured for load balancing, failover, auto-scaling, etc.

Figure 9:
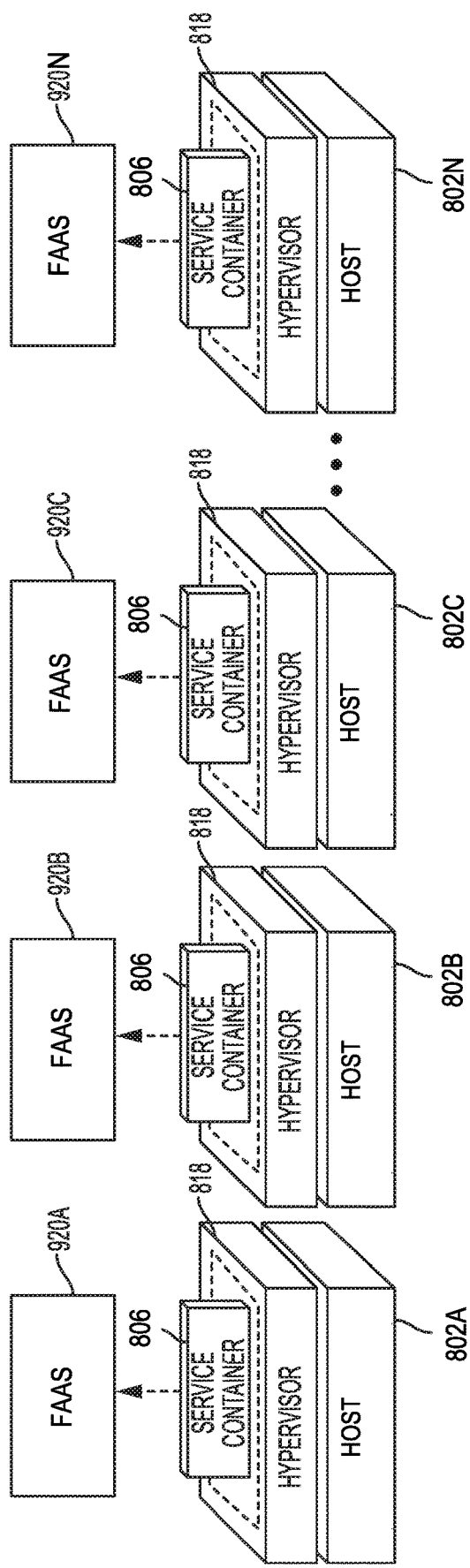
FIG. 9 illustrates an example architecture for hosting service containers running FaaS environments.

FIG. 9 illustrates an example architecture for hosting service containers running FaaS environments. Hosts 802A, 802B, 802C, 802N (collectively "802") can include hypervisors 818 which provide a virtualization layer for containerization. In this example, the hosts 802 can be separate devices, such as endpoints, and/or separate hardware resources in a single device or environment. For example, the hosts 802 can be different hardware resources (e.g., CPU cores, storage, etc.) on a single system (e.g., a server, router, etc.) or a distributed environment (e.g., the cloud 102).

The hypervisors 818 can host service containers 806. The service containers 806 can host FaaS environments 920A, 920B, 920C, 920N (collectively "920"). The FaaS environments 920 can include serverless code and can act as execution environments for running functions, such as functions 706. The functions can be uploaded to the FaaS environments 920 and invoked based on one or more parameters. Once invoked, the FaaS environments 920 can execute the functions and perform the actions defined by the functions.

Figure 10:
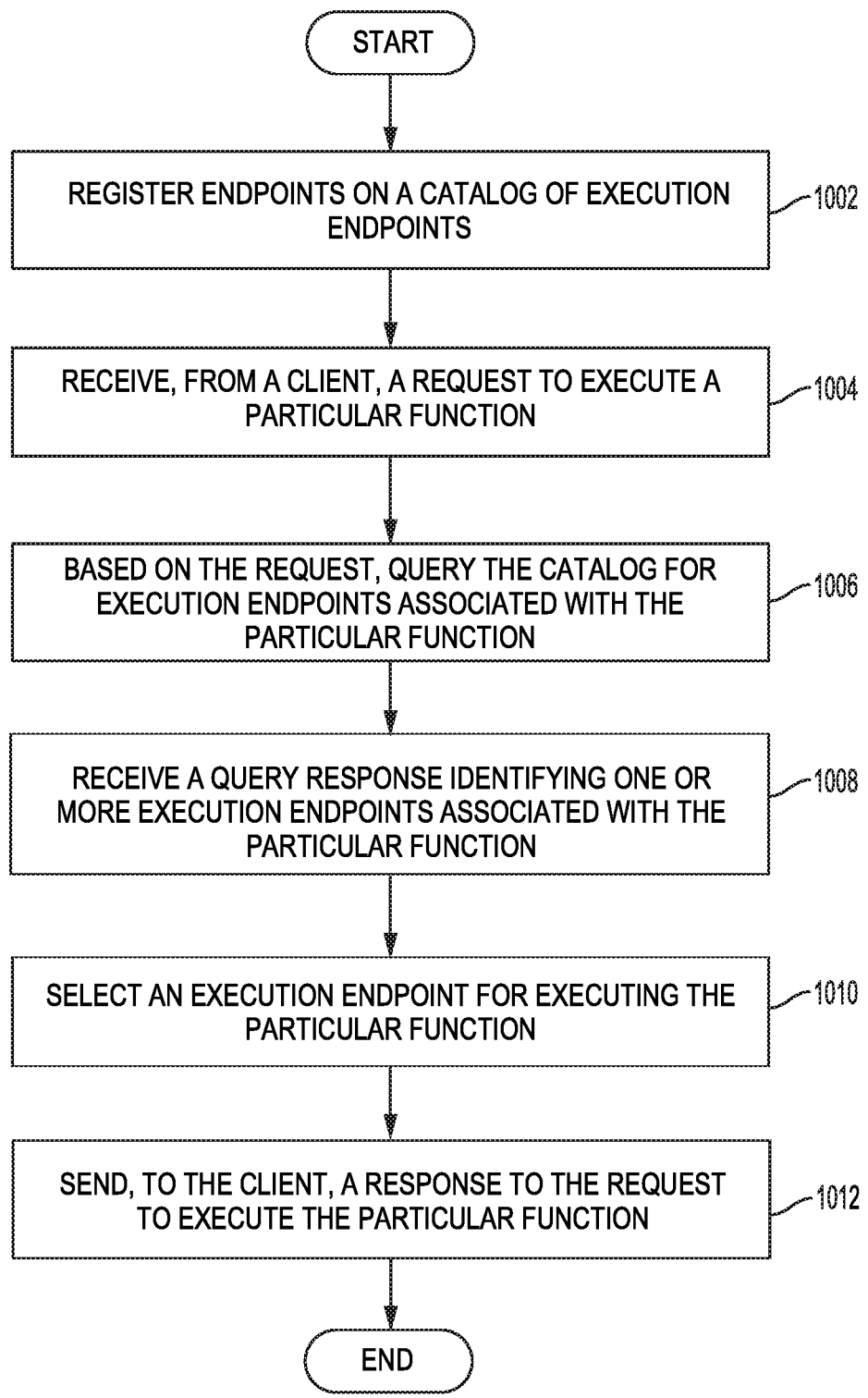
FIG. 10 illustrates an example method for distributed function routing in a function delivery network.

Having disclosed some basic system components and concepts, the disclosure now turns to the example method for distributed function routing in a function delivery network, as shown in FIG. 10. For the sake of clarity, the method is described in terms of the function router 504 and execution endpoints 704 shown in FIG. 7. The steps outlined herein are non-limiting examples provided for illustration purposes, and can be implemented in any combination thereof, including combinations that exclude, add, or modify certain steps.

At step 1002, the function router 504 registers a plurality of execution endpoints (e.g., execution endpoints 704) on a catalog of execution endpoints. The catalog can be, for example, a database (e.g., database 506) identifying execution endpoints and functions in the function delivery network, as well as information for routing function calls to particular execution endpoints in the function delivery network. The function router 504 can query the catalog to identify any execution endpoints, clients, functions, etc., in the function delivery network, as well as related information such as location information, capabilities, characteristics, etc.

Each of the plurality of execution endpoints includes a respective runtime environment capable of executing one or more functions (e.g., functions 706). The plurality of execution endpoints can be located in one or more networks and/or geographic locations. In some cases, the plurality of execution endpoints can be distributed across different networks, such as one or more local networks, cloud networks, regional networks, fog networks, etc. For example, the plurality of execution endpoints can include endpoints residing on the cloud 102, endpoints residing on the fog layer 156 (e.g., fog nodes 162), local endpoints 116, etc.

At step 1004, the function router 504 receives, from a client (e.g., application 702, robotic arm 404, etc.), a request to execute a particular function. For example, the client can send a call to the function router 504 requesting execution of the particular function. The request can identify the particular function (e.g., function ID) and can include additional information associated with the request, such as performance parameters, cost parameters, security parameters, location parameters, execution endpoint selection preferences, selection rules, metadata, etc.

For example, the request can include a function ID, a client ID, a location ID associated with the client, a runtime ID, a performance requirement (e.g., a latency value, a priority, a quality of service indication, etc.), a security requirement (e.g., security level for execution of the function), a cost (e.g., a maximum cost, cost range, a cost preference, etc.), a user and/or account ID, a timestamp, etc. The information in the response can be used by the function router 504 to identify and select an execution endpoint for the particular function, as further described below.

Based on the request, at step 1006, the function router 504 can query the catalog (e.g., database 506) for execution endpoints associated with the particular function and, at step 1008, receive a query response identifying one or more execution endpoints associated with the particular function. For example, the function router 504 can send a query to the database 506 to locate the particular function (e.g., the function ID of the particular function), execution endpoints associated with the particular function, and/or a particular runtime environment for the particular function (e.g., runtime ID associated with function ID of the particular function). The query can be a lookup of the function requested by the client and the execution endpoints having the runtime environment for executing the function requested by the client.

In some cases, the query can also include other parameters used by the function router 504 for searching the catalog and identifying and/or selecting an execution endpoint for the particular function. For example, the query can include location parameters, performance parameters, cost parameters, security parameters, etc. Such parameters can be based on the request and/or the client, and can be used to further filter or narrow the search for execution endpoints in the catalog. In some cases, the parameters can include any parameters included in the request for identifying an execution endpoint that satisfies the parameters for the request. For example, if the request includes a location parameter, such as a latitude and longitude, the query can use the location parameter when searching the catalog to filter the execution endpoints identified by the query based on the location parameters.

To illustrate, assume the request from the client includes a function ID, a runtime ID, a client ID, and a location ID. Assume the function ID corresponds to Function A, the runtime ID corresponds to Runtime B, and the location ID corresponds to a geographic location, such as New York City. The function router 504 can use the various ID's in the request to query the catalog for execution endpoints having Function A and/or Runtime B, and residing in New York City. The function router 504 can receive a query response identifying which execution endpoints have the runtime environment requested, can execute the particular function, and are physically located closest to the client.

Assume that the request in this example also includes an availability parameter specifying a certain availability requested for the execution endpoint. The function router 504 can include the availability parameter in the query to further filter the results in the query response to those execution endpoints that have the availability corresponding to the availability parameter. The function router 504 can use other parameters or combination of parameters to narrow the query result and identify execution endpoints with more or less granularity.

At step 1010, the function router 504 selects an execution endpoint for executing the particular function. The function router 504 can select the execution endpoint based on one or more criteria associated with the request, such as a function parameter, a runtime parameter, a location parameter, a security parameter, a cost parameter, a performance parameter, etc., as previously explained.

The function router 504 can select the execution endpoint based on the response query from step 1008. For example, the function router 504 can select one or more execution endpoints associated with the particular function identified in the query response. In some cases, the function router 504 can select all execution endpoints identified in the query response from step 1008. In other cases, the function router 504 can select a subset (e.g., one or more) of the execution endpoints in the query response. For example, the function router 504 can apply a filter to a list of execution endpoints identified in the query response to further narrow the list of execution endpoints to one or more execution endpoints. The function router 504 can filter the list of execution endpoints based on one or more criteria, such as additional parameters, routing or selection rules, client policies, user preferences, etc.

For example, the function router 504 can receive a query response identifying ten execution endpoints that match the criteria used by the function router 504 in the query to the catalog of execution endpoints. The function router 504 can then select one or more execution endpoints from the ten execution endpoints based on one or more factors, such as a proximity, a priority, a security level, a performance level, a cost, a policy, a rule, a preference, etc. For example, the function router 504 can select an execution endpoint from the ten execution endpoints that is available, is physically or geographically closest to the client, has a lowest latency, has a highest performance, has a lowest cost, has a highest security, has a lowest workload, has a fastest network connection, has a certain permission, complies with a certain rule or policy (e.g., allow policy, block policy, priority policy, etc.), and/or has any other characteristics.

At step 1012, the function router 504 sends, to the client, a response to the request to execute the particular function. The response can identify the execution endpoint selected to execute the particular function for the client. For example, the response can include an execution endpoint name, an address for invoking the function from the execution endpoint (e.g., a function execution endpoint address, a URL, an HTTP redirect, an IP address, a network name, etc.), a function name or ID, an expiration parameter, an execution condition or argument, etc.

The client can receive the response and invoke the particular function at the execution endpoint based on the response. For example, the client can invoke the particular function at the execution endpoint based on an address in the response. In some cases, the response can include a redirect (e.g., HTTP redirect) which redirects the client's function execution request to the execution endpoint and triggers the execution endpoint to run the particular function.

In some cases, prior to sending the response to the client, the function router 504 can contact the execution endpoint selected to request the address for invoking the particular function at the execution endpoint. When contacting the execution endpoint, the function router 504 can also include additional requests or instructions for the execution endpoint. For example, the function router 504 can instruct the execution endpoint to load the particular function and generate an address for the function at the execution endpoint.

In some cases, the execution endpoint may not have the function stored locally. Here, the function router 504 can instruct the execution endpoint to fetch or download the function from a storage location, such as a repository of functions (e.g., repository 606). The instruction to fetch or download the function can include information identifying the function, such as a function ID, and/or information for fetching or downloading the function, such as an address where the function is located and/or can be fetched or downloaded. The instruction to fetch or download the function can also instruct the execution endpoint to load the function after fetching or downloading the function, and generate an address the client can use to invoke the function from the execution endpoint.

Moreover, the function router 504 can also provide to the execution endpoint an indication that the client is authorized to execute the particular function from the execution endpoint. For example, the function router 504 can notify the execution endpoint that the client is authenticated and/or authorized to execute the function from the execution endpoint. The execution endpoint can use this notification for security to ensure that the function is only invoked by authorized or authenticated clients.

In this example, after instructing the execution to load the function and generate an address for the function, the function router 504 can receive the address from the execution endpoint. The function router 504 can include the address from the execution endpoint in the response to the client at step 1012. As previously mentioned, the client can use the address in the response to then call the function at the execution endpoint.

The function router 504 can periodically poll the plurality of execution endpoints registered in the catalog for information, such as availability, performance level, security level, cost, location, runtime information, etc., and update the catalog when any changes occur. This way, the function router 504 can maintain the information in the catalog accurate and current. The function router 504 can poll execution endpoints based on a schedule, a time interval, a user request, an event, etc.

For example, the function router 504 can poll an execution endpoint every day, after a certain period of time lapses since the last communication with the execution endpoint, after a period of time since the last polling request to the execution endpoint, after a period of inactivity detected for the execution endpoint, based on a polling queue, etc. As another example, the function router 504 can poll execution endpoints based on one or more polling triggering events, such as detected inactivity, a detected type or amount of activity, a detected modification or update associated with an execution endpoint (e.g., software update, location change, change in availability, change in performance, etc.), a security event, etc.

The function router 504 can update the catalog as it detects changes in execution endpoint, client, function, runtime environment, and/or authentication parameters (e.g., location, runtime environment, availability, security, performance, cost, etc.). For example, the function router 504 can update the catalog to register new execution endpoints, delete execution endpoints (e.g., execution endpoints no longer available, registered, etc.), add new clients, remove clients, edit clients, etc. The function router 504 can also update the catalog to change location information, such as a location of an execution endpoint, a location of a client, a location of a function, etc.

In some cases, after receiving the response from the function router 504 and invoking the function at the selected execution endpoint, the client can continue to use the selected execution endpoint for future function execution requests. For example, the client can continue to invoke the function at the selected execution endpoint in future requests until the function and/or execution endpoint are no longer available, until an expiration period lapses, until a limit of requests from the client to the execution endpoint are made, etc. When the client needs a new execution endpoint, the client can send a request to the function router 504 as described at step 1002 to start the process of finding an execution endpoint as previously described.

The disclosure now turns to FIGS. 11 and 12, which illustrate example hardware components and devices suitable for hosting runtime or execution environments, running functions, performing routing and execution endpoint selection operations, and performing any other computing operations.

FIG. 11 illustrates an example network device 1100 suitable for performing function routing operations, hosting execution environments, and running functions. Network device 1100 includes a master central processing unit (CPU) 1104, interfaces 1102, and a connection 1110 (e.g., a PCI bus). When acting under the control of appropriate software or firmware, the CPU 1104 is responsible for executing packet management, error detection, and/or routing functions.

The CPU 1104 can accomplish these functions under the control of software including an operating system and any appropriate applications software. CPU 1104 may include one or more processors 1108 such as a processor from the Intel X86 family of microprocessors, the Motorola family of microprocessors or the MIPS family of microprocessors. In an alternative embodiment, processor 1108 is specially designed hardware for controlling the operations of network device 1100. In some cases, a memory 1106 (such as non-volatile RAM, a TCAM, and/or ROM) can form part of CPU 1104. However, there are many different ways in which memory could be coupled to the system.

The interfaces 1102 are typically provided as modular interface cards (sometimes referred to as "line cards"). Generally, they control the sending and receiving of data packets over the network and sometimes support other peripherals used with the network device 1100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM.

The independent processors may control communications and intensive tasks such as packet switching, media control, signal processing, crypto processing, function routing, execution endpoint management, network management, and so forth. By providing separate processors for the communications intensive tasks, these interfaces allow the master microprocessor 1104 to efficiently perform routing computations, network diagnostics, security functions, etc.

Although the system shown in FIG. 11 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1106) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1106 could also hold various containers and virtualized execution environments and data.

The network device 1100 can also include an application-specific integrated circuit (ASIC) 1112, which can be configured to perform routing and/or switching operations. The ASIC 1112 can communicate with other components in the network device 1100 via the bus 1110, to exchange data and signals and coordinate various types of operations by the network device 1100, such as routing, switching, and/or data storage operations, for example.

FIG. 12 illustrates an example architecture of a system 1200, including various hardware computing components which are in electrical communication with each other using a connection 1206. System 1200 includes a processing unit (CPU or processor) 1204 and a system connection 1206 that couples various system components including the system memory 1220, such as read only memory (ROM) 1218 and random access memory (RAM) 1216, to the processor 1204.

The system 1200 can include a cache of high-speed memory connected directly with, in close proximity to, or integrated as part of the processor 1204. The system 1200 can copy data from the memory 1220 and/or the storage device 1208 to the cache 1202 for quick access by the processor 1204. In this way, the cache can provide a performance boost that avoids processor 1204 delays while waiting for data. These and other modules can control or be configured to control the processor 1204 to perform various actions. Other system memory 1220 may be available for use as well. The memory 1220 can include multiple different types of memory with different performance characteristics.

The processor 1204 can include any general purpose processor and a service component, such as service 1 1210, service 2 1212, and service 3 1214 stored in storage device 1208, configured to control the processor 1204 as well as a special-purpose processor where software instructions are incorporated into the actual processor design. The processor 1204 may essentially be a completely self-contained computing system, containing multiple cores or processors, a bus, memory controller, cache, etc. A multi-core processor may be symmetric or asymmetric.

To enable user interaction with the computing device 1200, an input device 1222 can represent any number of input mechanisms, such as a microphone for speech, a touch-sensitive screen for gesture or graphical input, keyboard, mouse, motion input, speech and so forth. An output device 1224 can also be one or more of a number of output mechanisms known to those of skill in the art. In some instances, multimodal systems can enable a user to provide multiple types of input to communicate with the computing device 1200. The communications interface 1226 can generally govern and manage the user input and system output. There is no restriction on operating on any particular hardware arrangement and therefore the basic features here may easily be substituted for improved hardware or firmware arrangements as they are developed.

Storage device 1208 can be a non-volatile memory, a hard disk, or any other type of computer readable media which can store data for access by a computer, such as magnetic cassettes, flash memory cards, solid state memory devices, digital versatile disks, cartridges, random access memories (RAMs) 1216, read only memory (ROM) 1218, and hybrids thereof. In some cases, storage device 1208 can store an execution or runtime environment for executing code, one or more functions for execution via the execution or runtime environment, one or more resources (e.g., libraries, data objects, APIs, etc.), and so forth.

The system 1200 can include an integrated circuit 1228, such as an application-specific integrated circuit (ASIC) configured to perform various operations. The integrated circuit 1228 can be coupled with the connection 1206 in order to communicate with other components in the system 1200.

The storage device 1208 can include software services 1210, 1212, 1214 for controlling the processor 1204. In some cases, the software services 1210, 1212, 1214 can include, for example, operating system or kernel services, application services, services associated with one or more functions, etc. Other hardware or software modules are contemplated. The storage device 1208 can be connected to the system connection 1206. In one aspect, a hardware module that performs a particular function can include the software component stored in a computer-readable medium in connection with the necessary hardware components, such as the processor 1204, connection 1206, output device 1224, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:
1. A method comprising:
   registering, via a function router, a plurality of execution endpoints on a catalog of execution endpoints, each of the plurality of execution endpoints comprising a respective runtime environment capable of executing one or more functions, the plurality of execution endpoints being located in one or more networks;
   receiving, via the function router, from a client, a request to execute a particular function and corresponding first service criteria;

based on the request, querying, via the function router, the catalog of execution endpoints for execution endpoints associated with the particular function;

receiving, via the function router, a query response identifying one or more execution endpoints that can perform the particular function and meeting the corresponding first service criteria;

filtering with second service criteria, via the function router, an execution endpoint from the identified one or more execution endpoints; and sending, via the function router, to the client, a response to the request to execute the particular function, the response identifying the execution endpoint selected for executing the particular function;

wherein the first service criteria includes at least one of a location parameter, a performance parameter, a cost parameter, and/or a security parameter;

wherein the second service criteria includes at least one of a proximity, a priority, a security level, a performance level, a cost, a policy, a rule, and/or a preference.

2. The method of claim 1, further comprising:
sending, via the function router, to the execution endpoint, a second request to load the particular function from a storage location and generate a function execution endpoint address for invoking the particular function at the execution endpoint.

3. The method of claim 2, wherein the response comprises the function execution endpoint address for invoking the particular function at the execution endpoint.

4. The method of claim 3, wherein the function execution endpoint address comprises at least one of a unified resource locator (URL) corresponding to the particular execution endpoint or a hypertext transfer protocol (HTTP) redirect configured to redirect the client to the particular function at the execution endpoint.

5. The method of claim 2, wherein the second request comprises at least one of an indication that the client is authorized to execute the particular function on the execution endpoint or an instruction to fetch the particular function from the storage location.

6. The method of claim 5, wherein the storage location comprising one or more function repositories, and wherein the one or more networks comprise a cloud network and one or more local networks.

7. The method of claim 1, wherein registering the plurality of execution endpoints comprises storing, in the catalog of execution endpoints, at least one of respective location information associated with each execution endpoint, a respective identifier associated with each execution endpoint, a respective runtime identifier associated with each execution endpoint, one or more respective functions associated with each execution endpoint, and one or more parameters associated with each execution endpoint.

8. The method of claim 7, wherein the one or more criteria comprises at least one of an availability, a location, a cost, a performance level, a proximity, or a security level.

9. The method of claim 1, further comprising:
polling, via the function router, at least one of the plurality of execution endpoints for respective information updates; and
updating the catalog of execution endpoints to include one or more of the respective information updates.

10. The method of claim 9, wherein the respective information updates comprise at least one of a respective availability, a respective runtime environment, a respective security level, a respective cost, a respective performance level, a respective indication of associated functions, a respective location, and a respective status.

11. The method of claim 1, wherein the catalog of execution endpoints associates at least one of:
respective functions with respective execution endpoints;
respective execution endpoints with respective locations;
respective functions with respective runtime environments;
respective functions with respective clients;
respective clients with respective execution endpoints; and
respective execution endpoints with respective parameters.

12. The method of claim 1, wherein the plurality of execution endpoints reside on a plurality of different networks, wherein the one or more criteria comprises a location, and wherein the execution endpoint is selected based on a proximity between the client and the execution endpoint.

13. A system comprising:
one or more processors; and
at least one computer-readable storage medium having stored therein instructions which, when executed by the one or more processors, cause the system to:
register a plurality of execution endpoints on a catalog of execution endpoints, each of the plurality of execution endpoints comprising a respective runtime environment capable of executing one or more functions, the plurality of execution endpoints being located in one or more networks;
receive from a client, a request to execute a particular function and corresponding first service criteria;
based on the request, query the catalog of execution endpoints for execution endpoints associated with the particular function;
receive a query response identifying one or more execution endpoints that can perform the particular function and meeting the corresponding first service criteria;
filter with second service criteria an execution endpoint from the identified one or more execution endpoints; and
send, to the client, a response to the request to execute the particular function, the response identifying the execution endpoint selected for executing the particular function;
wherein the first service criteria includes at least one of a location parameter, a performance parameter, a cost parameter, and/or a security parameter;
wherein the second service criteria includes at least one of a proximity, a priority, a security level, a performance level, a cost, a policy, a rule, and/or a preference.

14. The system of claim 13, the at least one computer-readable storage medium having stored therein additional instructions which, when executed by the one or more processors, cause the system to:
send, to the execution endpoint, a second request to load the particular function from a storage location and generate a function execution endpoint address for invoking the particular function at the execution endpoint, wherein the response comprises the function execution endpoint address for invoking the particular function at the execution endpoint.

15. The system of claim 13, wherein registering the plurality of execution endpoints comprises storing, in the catalog of execution endpoints, at least one of respective location information associated with each execution endpoint, a respective identifier associated with each execution endpoint, a respective runtime identifier associated with each execution endpoint, one or more respective functions associated with each execution endpoint, and one or more parameters associated with each execution endpoint, wherein the one or more criteria comprises at least one of an availability, a location, a cost, a performance level, a proximity, or a security level.

16. The system of claim 13, wherein the one or more networks comprise a plurality of different networks, wherein the plurality of execution endpoints reside on the plurality of different networks, wherein the one or more criteria comprises a location, and wherein the execution endpoint is selected based on a proximity between the client and the execution endpoint.

17. A non-transitory computer-readable storage medium having stored therein instructions which, when executed by one or more processors, cause the one or more processors to:
   register, via a function router, a plurality of execution endpoints on a catalog of execution endpoints, each of the plurality of execution endpoints comprising a respective runtime environment capable of executing one or more functions, the plurality of execution endpoints being located in one or more networks;
   receive, via the function router, from a client, a request to execute a particular function and corresponding first service criteria;
   based on the request, query, via the function router, the catalog of execution endpoints for execution endpoints associated with the particular function;
   receive, via the function router, a query response identifying one or more execution endpoints that can perform the particular function and meeting the corresponding first service criteria;
   filter with second service criteria, via the function router, an execution endpoint from the identified one or more execution endpoints for executing the particular function; and
   send, via the function router, to the client, a response to the request to execute the particular function, the response identifying the execution endpoint selected for executing the particular function;
   wherein the first service criteria includes at least one of a location parameter, a performance parameter, a cost parameter, and/or a security parameter;
   wherein the second service criteria includes at least one of a proximity, a priority, a security level, a performance level, a cost, a policy, a rule, and/or a preference.

18. The non-transitory computer-readable storage medium of claim 17, storing additional instructions which, when executed by the one or more processors, cause the one or more processors to:
   send, to the execution endpoint, a second request to load the particular function from a storage location and generate a function execution endpoint address for invoking the particular function at the execution endpoint, wherein the response comprises the function execution endpoint address for invoking the particular function at the execution endpoint.

19. The non-transitory computer-readable storage medium of claim 17, wherein registering the plurality of execution endpoints comprises storing, in the catalog of execution endpoints, at least one of respective location information associated with each execution endpoint, a respective identifier associated with each execution endpoint, a respective runtime identifier associated with each execution endpoint, one or more respective functions associated with each execution endpoint, and one or more parameters associated with each execution endpoint, wherein the one or more criteria comprises at least one of an availability, a location, a cost, a performance level, a proximity, or a security level.

20. The non-transitory computer-readable storage medium of claim 17, wherein the one or more networks comprise a plurality of different networks, wherein the plurality of execution endpoints reside on the plurality of different networks, wherein the one or more criteria comprises a location, and wherein the execution endpoint is selected based on a proximity between the client and the one or more execution endpoints associated with the particular function.

* * * * *